(12) United States Patent
Ohta et al.

(10) Patent No.: US 9,924,508 B2
(45) Date of Patent: Mar. 20, 2018

(54) COMMUNICATION DURATION CONFIGURING METHOD, RELAY STATION, MOBILE STATION AND MOBILE COMMUNICATION SYSTEM

(75) Inventors: Yoshiaki Ohta, Yokohama (JP); Yoshihiro Kawasaki, Yokosuka (JP); Yoshinori Tanaka, Yokohama (JP); Tetsuya Yano, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 13/596,908

(22) Filed: Aug. 28, 2012

(65) Prior Publication Data

US 2012/0320823 A1 Dec. 20, 2012

Related U.S. Application Data

(63) Continuation of application No. PCT/JP2010/001773, filed on Mar. 12, 2010.

(51) Int. Cl.
*H04W 72/04* (2009.01)
*H04L 1/18* (2006.01)
*H04B 7/155* (2006.01)
*H04W 84/04* (2009.01)
*H04W 88/08* (2009.01)
*H04L 1/00* (2006.01)

(52) U.S. Cl.
CPC .... *H04W 72/0426* (2013.01); *H04B 7/15528* (2013.01); *H04L 1/1822* (2013.01); *H04L 1/1848* (2013.01); *H04L 1/1854* (2013.01); *H04L 1/1812* (2013.01); *H04L 2001/0097* (2013.01); *H04W 72/0413* (2013.01); *H04W 84/047* (2013.01); *H04W 88/085* (2013.01)

(58) Field of Classification Search
CPC ............. H04W 72/0426; H04L 1/1822; H04L 1/1848; H04B 7/15528
See application file for complete search history.

(56) References Cited

U.S. PATENT DOCUMENTS

| 2008/0247354 | A1 | 10/2008 | Hsieh et al. | |
| 2009/0181689 | A1 | 7/2009 | Lee et al. | |
| 2010/0103860 | A1* | 4/2010 | Kim et al. | 370/315 |
| 2010/0316096 | A1* | 12/2010 | Adjakple et al. | 375/211 |
| 2011/0182247 | A1* | 7/2011 | Chun et al. | 370/329 |

(Continued)

FOREIGN PATENT DOCUMENTS

| CA | 2 792 397 A1 | 9/2011 |
| JP | 2013-506367 | 2/2013 |

(Continued)

OTHER PUBLICATIONS

Notice of Preliminary Rejection issued for corresponding Korean Patent Application No. 10-2014-7001267, dated Mar. 11, 2014, with an English translation.

(Continued)

*Primary Examiner* — Omer S Mian
(74) *Attorney, Agent, or Firm* — Myers Wolin, LLC

(57) ABSTRACT

A backhaul is configured in such a manner that a HARQ process in which a HARQ on an upstream access link is incapable of being partly or entirely performed is limited to a particular one of a plurality of HARQ processes. As a result, complexity of scheduling is reduced and efficiency of the access link is improved.

12 Claims, 39 Drawing Sheets

(56) References Cited

U.S. PATENT DOCUMENTS

| | | | |
|---|---|---|---|
| 2012/0027110 A1* | 2/2012 | Han et al. | 375/260 |
| 2012/0093061 A1* | 4/2012 | Charbit et al. | 370/315 |
| 2012/0320823 A1* | 12/2012 | Ohta et al. | 370/315 |

FOREIGN PATENT DOCUMENTS

| | | |
|---|---|---|
| KR | 10-2008-0090353 A | 10/2008 |
| KR | 10-2009-0078723 A | 7/2009 |
| WO | 2009/022826 A1 | 2/2009 |
| WO | 2011/038801 | 4/2011 |

OTHER PUBLICATIONS

Japanese Office Action issued by Japanese Patent Office for corresponding Japanese Patent Application No. 2012-504152, dated Oct. 29, 2013, with partial English translation.

3GPP TR 36. 913 V8. 0. 1 (Mar. 2009), 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.

3GPP TR 36. 912 V9. 0. 0 (Sep. 2009), 3rd Generation Partnership Project; Technical Specification group Radio Access Network; "Feasibility study for Further Advancements for E-UTRA (LTE-Advanced) (Release 9)"; Sep. 2009.

3GPP TS 36. 133 V9. 2. 0 (Dec. 2009), 3rd Generation Partnership Project; Technical Specification Group Radio Access Network; Evolved Universal Terrestrial Radio Access (E-UTRA); "Requirements for support of radio resource management (Release 9)"; Dec. 2009.

Nokia, Nokia Siemens Networks; "FDD HARQ Issues over Un with 8ms SF Periodicity"; Agenda Item: 7.5.1.3; 3GPP TSG-RAN WG1 Meeting #60; R1-101447; San Francisco, CA, Feb. 22-26, 2010. Retrieved from the Internet <URL: http://www.3gpp.org/ftp/tsg_ran/WG1_RL1/TSGR1_60/Docs/R1-101447.zip> on May 24, 2010.

InterDigital; "FDD Relay Type I Backhaul interference and HARQ issues"; Agenda Item: 7.4; 3GPP TSG-RAN WG2 Meeting #67bis; R2-095634; Miyazaki, Japan, Oct. 12-16, 2009. Retrieved from the Internet <URL: http://www.3gpp.org/ftp/tsg_ran/WG2_RL2/TSGR2_67bis/Docs/R2-095634.zip> on May 24, 2010.

International Search Report issued for corresponding International Patent Application No. PCTJP2010/001773 dated Jun. 1, 2010.

First Notification of Office Action issued for corresponding Chinese Application No. 201080065277.2, dated Aug. 5, 2014, with an English translation.

Motorola, "Relay backhaul HARQ Discussion", Agenda Item: 7.5.1.3, Feb. 22-26, 2010, 3GPP TSG RAN WG1 Meeting #60, R1-101120, San Francisco, USA.

Office Action issued for corresponding Canadian Application No. 2,792,397 dated Aug. 7, 2015.

Extended European search report with supplementary European search report and the European search opinion issued by the European Patent Office for corresponding European Patent Application No. 10847344.8, dated Sep. 7, 2017.

Fujitsu: "Discussions on HARQ for LTE-A over Un interface", Agenda Item: 7.4.2, 3GPP TSG-RAN WG2 Meeting #68, R2-097064, Jeju Island, Korea, Nov. 9-14, 2009.

Huawei: "Consideration on FDD Type 1 Relay Frame Structure", Agenda Item: 15.3, 3GPP TSG-RAN WG1 Meeting #57, R1-091807, San Francisco, USA, May 4-8, 2009.

Research in Motion et al: "DL HARQ operation over the Un and Uu interfaces", Agenda Item: 7, 3GPP TSG-RAN WG2 Meeting #66, R2-093123, San Francisco, USA, May 4-8, 2009.

Office Action issued for corresponding Canadian Application No. 2,792,397 dated Aug. 1, 2016.

Office Action issued by the Canadian Intellectual Property Office for corresponding Canadian Application No. 2,792,397, dated Jan. 16, 2017.

NTT Docomo, Change Request for "Type 1 Relay definition", 3GPP TSG-RAN Meeting #60, R1-101281, San Francisco, USA, Feb. 22-26, 2010.

Interdigital, "FDD Relay Type I Backhaul interference and HARQ issues" Agenda Item: 7.4, 3GPP TSG-RAN WG2 Meeting #67, R2-094221, Shenzhen, China, Aug. 24-28, 2009.

Office Action issued by the Canadian Intellectual Property Office for corresponding Canadian Patent Application No. 2,792,397, dated Dec. 28, 2017.

Catt et al., "DL and UL Backhaul Subframe Allocation for Type I Relay in LTE-A", Agenda Item: 15.3, 3GPP TSG-RAN WG1 Meeting #57, R1-091989, San Francisco, USA, May 4-8, 2009.

* cited by examiner

FIG. 3
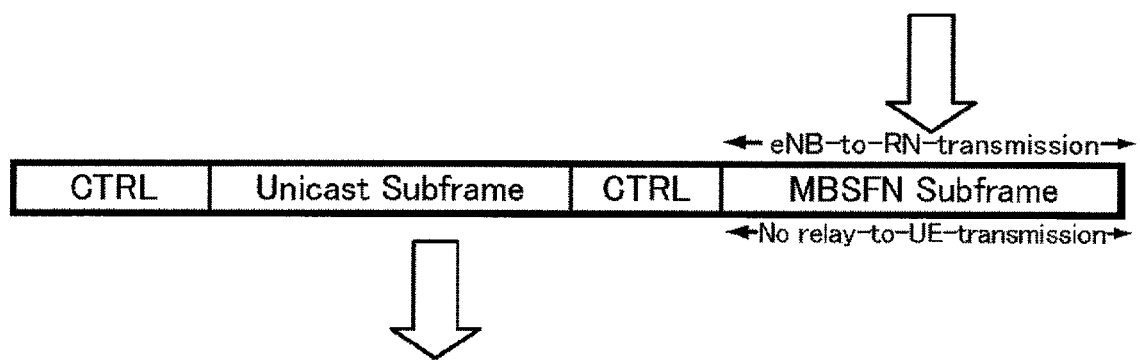
(a) DL backhaul
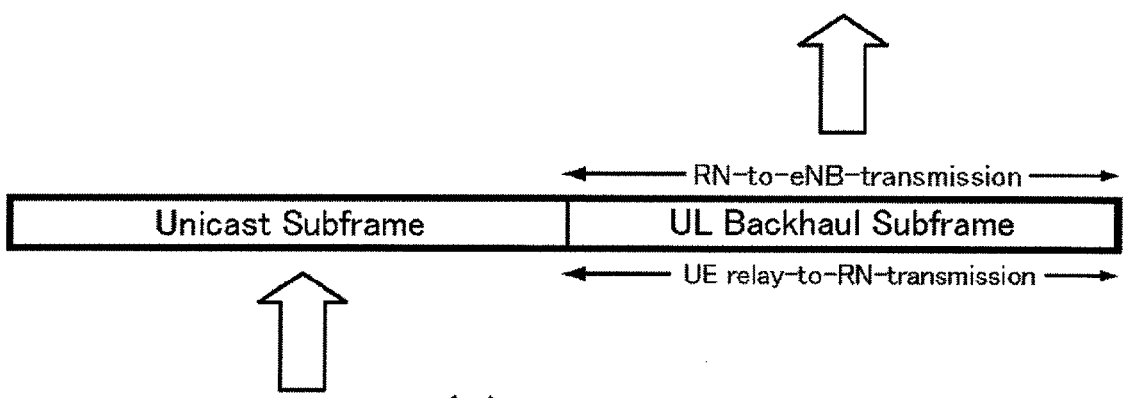
(b) UL backhaul

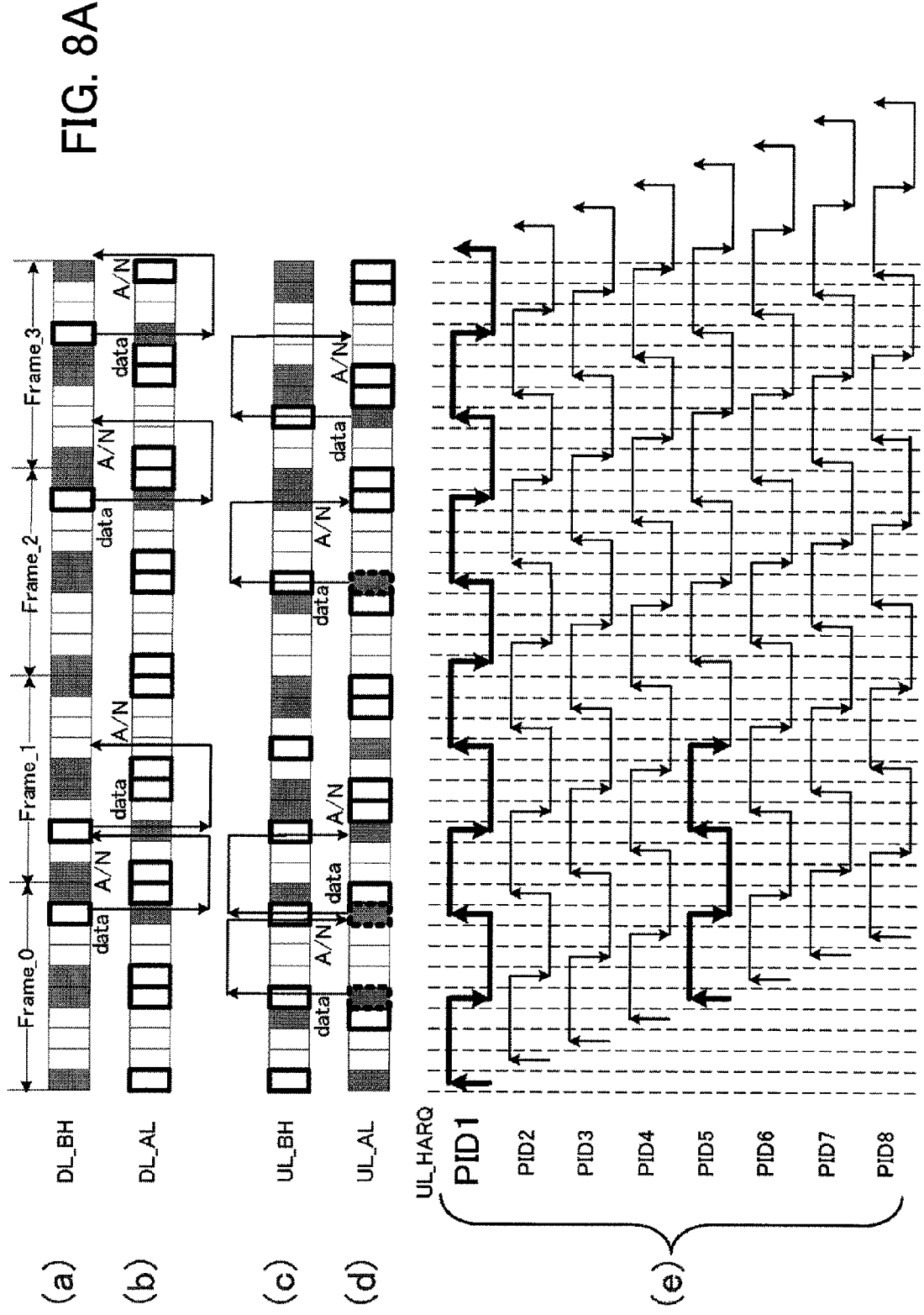

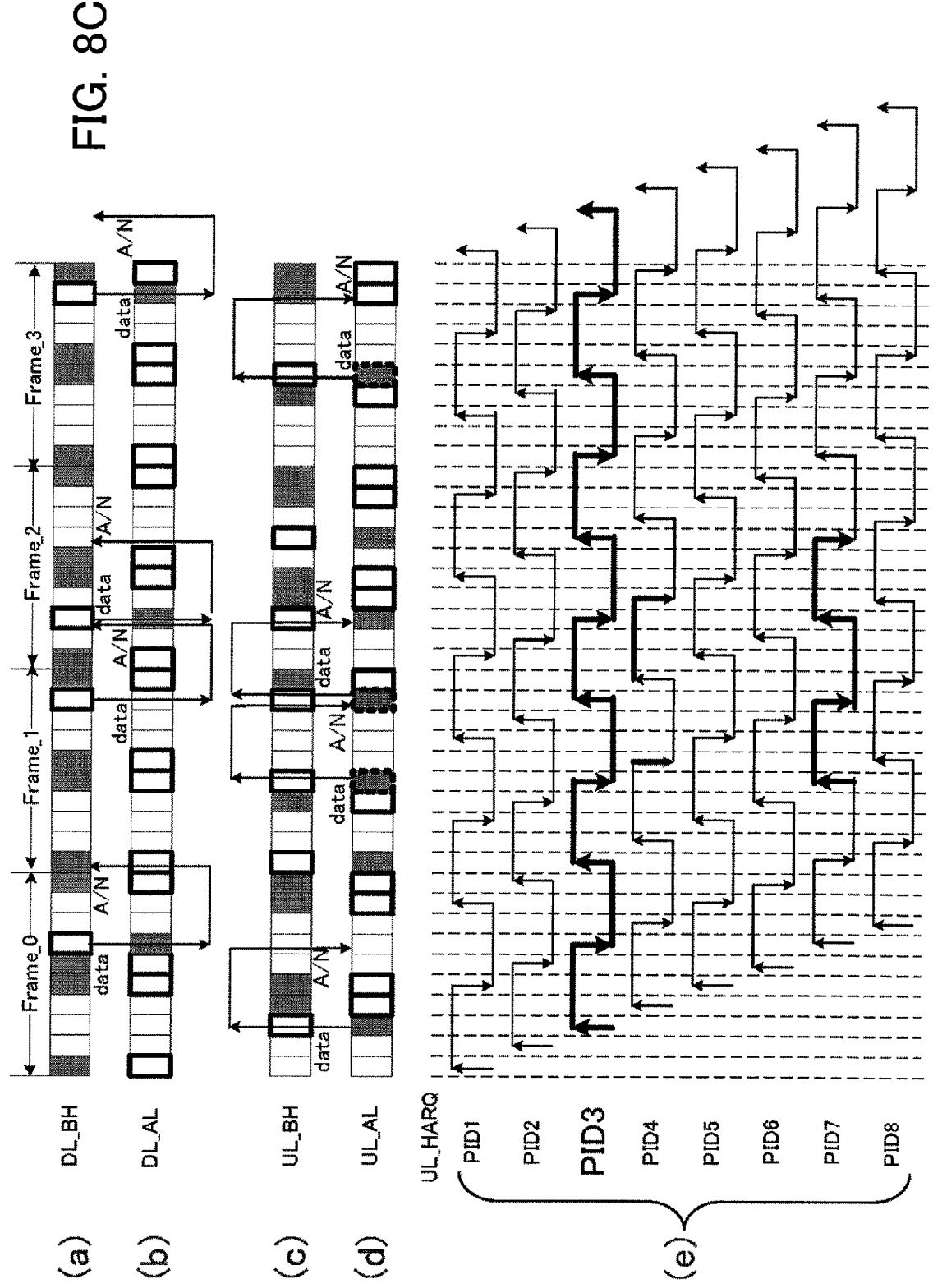

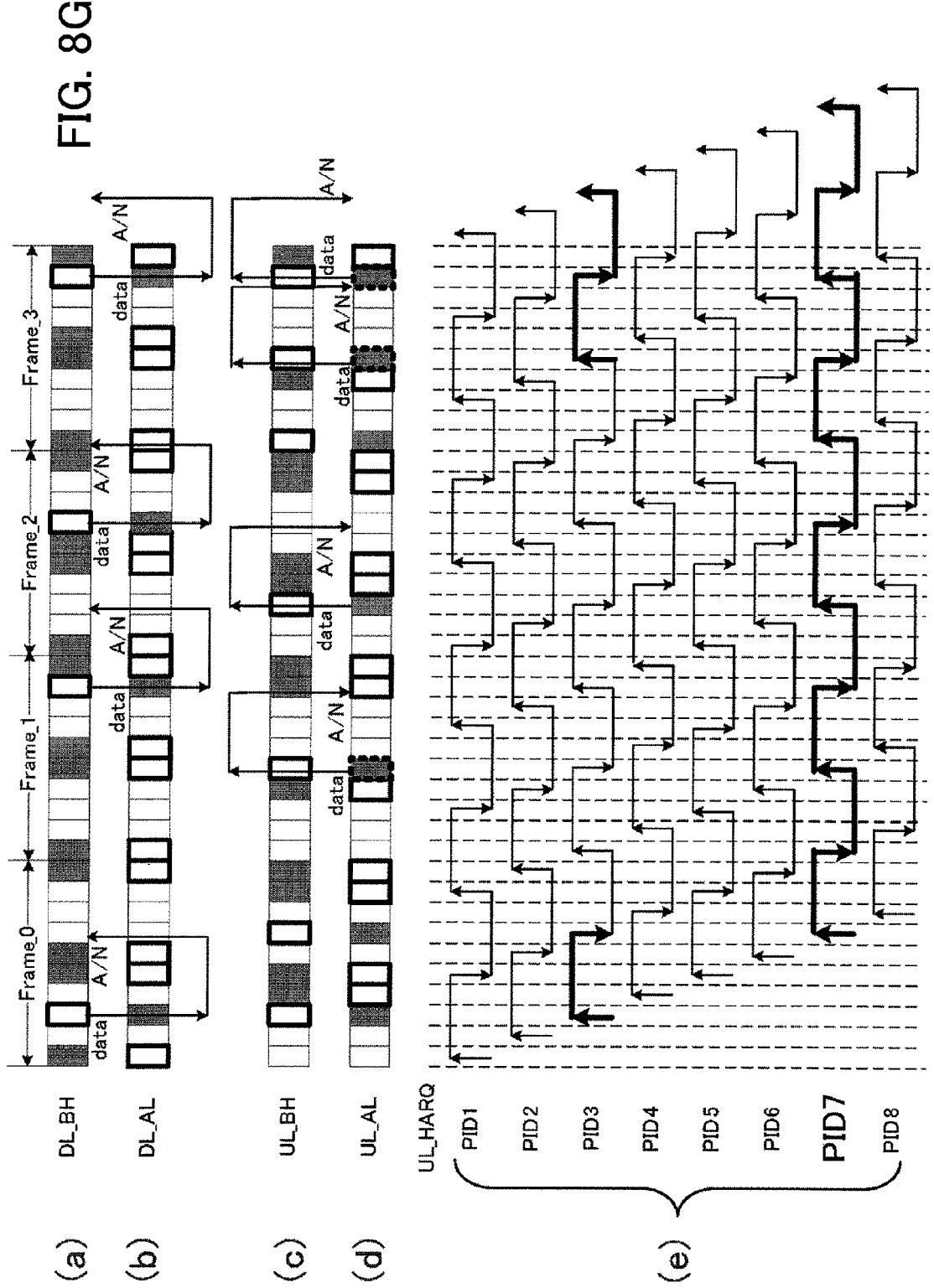

Values of subframe i through which RN receives ACK/NACK
(indicating that UL backhaul is present in position of iD)

| Configuration | SFN mod 4 = 0 | SFN mod 4 = 1 | SFN mod 4 = 2 | SFN mod 4 = 3 |
|---|---|---|---|---|
| 0 | 8 | 2 | 8 | 6 |
| 1 | 1 | 3 | 1 | 7 |
| 2 | 6 | 8 | 2 | 8 |
| 3 | 7 | 1 | 3 | 1 |
| 4 | 8 | 6 | 8 | 2 |
| 5 | 1 | 7 | 1 | 3 |
| 6 | 2 | 8 | 6 | 8 |
| 7 | 3 | 1 | 7 | 1 |

FIG. 9A

Values of subframe i through which RN transmits ACK/NACK
(indicating that DL backhaul is present in position of iD)

| Configuration | SFN mod 4 = 0 | SFN mod 4 = 1 | SFN mod 4 = 2 | SFN mod 4 = 3 |
|---|---|---|---|---|
| 0 | 0 | 2,6 | – | 2 |
| 1 | 1,5 | 7 | 5 | – |
| 2 | 2 | 0 | 2,6 | 5 |
| 3 | – | 1,5 | 7 | 2,6 |
| 4 | 5 | 2 | 0 | 7 |
| 5 | 2,6 | – | 1,5 | 0 |
| 6 | 7 | 5 | 2 | 1,5 |

FIG. 9B

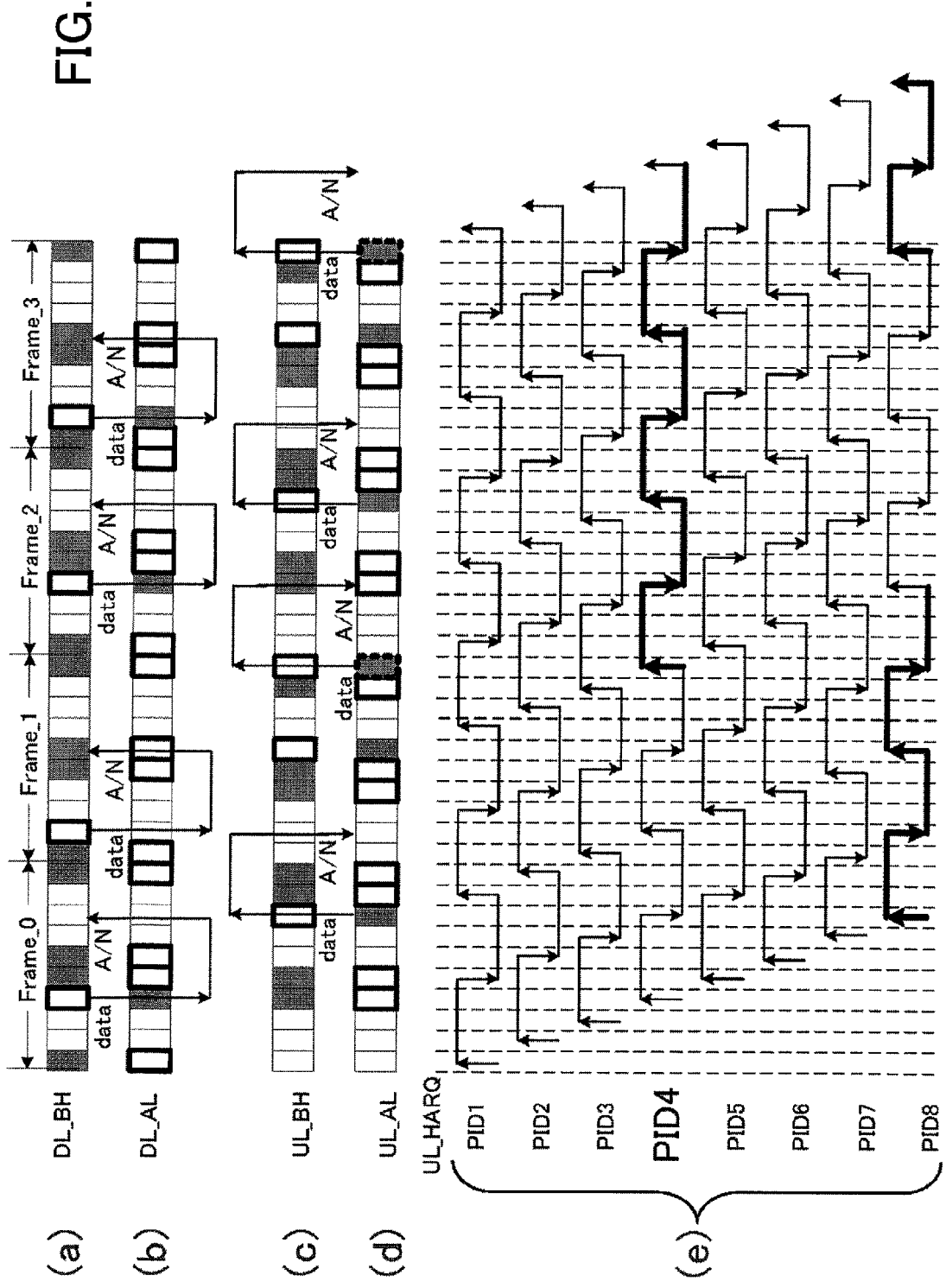

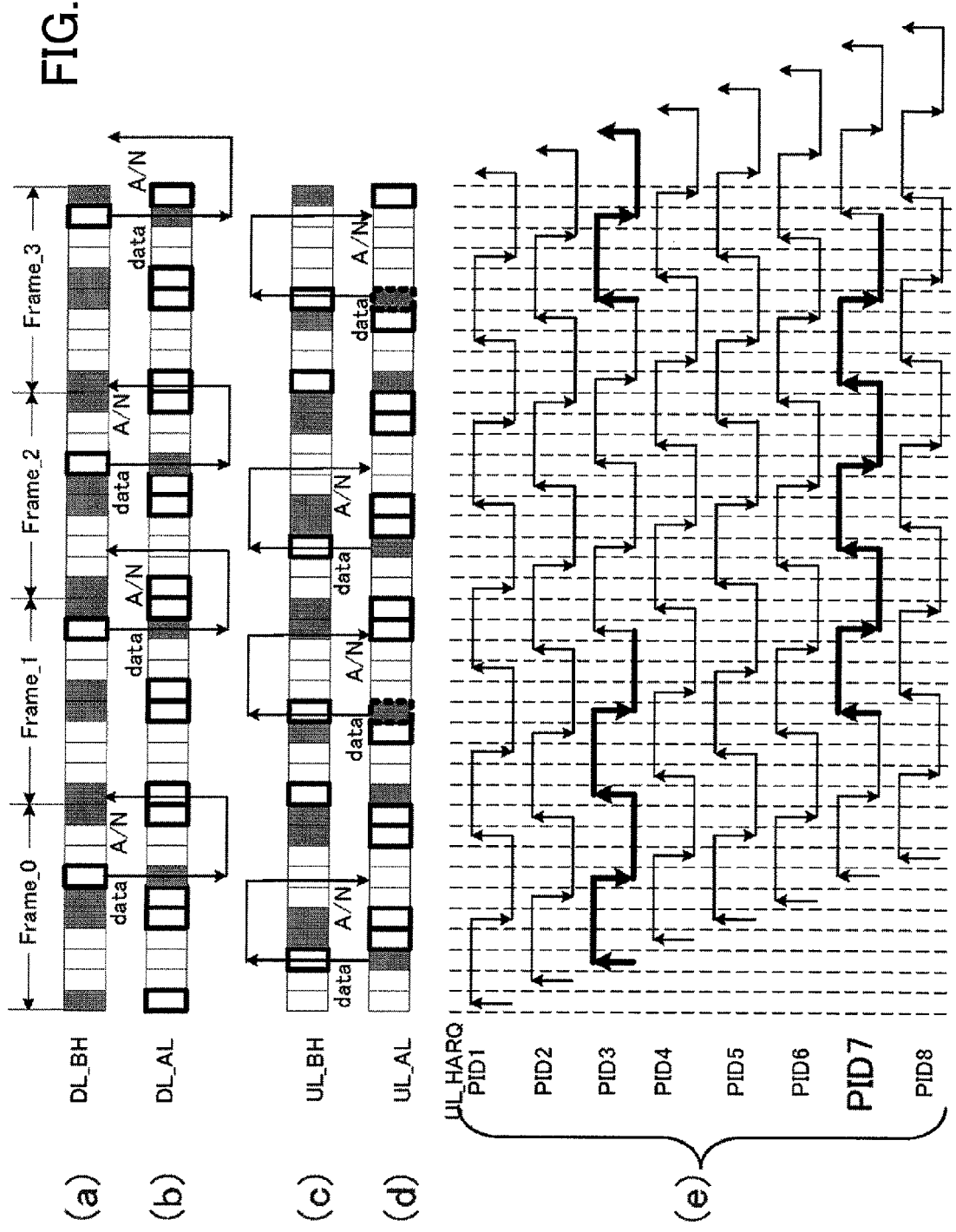

Values of subframe i through which ACK/NACK is received (indicating that UL backhaul is present in position of iD)

| Configuration | SFN mod 4 = 0 | SFN mod 4 = 1 | SFN mod 4 = 2 | SFN mod 4 = 3 |
|---|---|---|---|---|
| 0 | 8 | 6 | 8 | 6 |
| 1 | 1 | 3 | 1 | 3 |
| 2 | 6 | 8 | 6 | 8 |
| 3 | 3 | 1 | 3 | 1 |
| 4 | 8 | 6 | 8 | 6 |
| 5 | 1 | 3 | 1 | 3 |
| 6 | 6 | 8 | 6 | 8 |
| 7 | 3 | 1 | 3 | 1 |

FIG. 11A

Values of subframe i through which ACK/NACK is transmitted (indicating that DL backhaul is present in position of iD)

| Configuration | SFN mod 4 = 0 | SFN mod 4 = 1 | SFN mod 4 = 2 | SFN mod 4 = 3 |
|---|---|---|---|---|
| 0 | 0 | 2 | 0 | 2 |
| 1 | 5 | 7 | 5 | 7 |
| 2 | 2 | 0 | 2 | 0 |
| 3 | 7 | 5 | 7 | 5 |
| 4 | 0 | 2 | 0 | 2 |
| 5 | 5 | 7 | 5 | 7 |
| 6 | 2 | 0 | 2 | 0 |
| 7 | 7 | 5 | 7 | 5 |

FIG. 11B

COMMUNICATION DURATION CONFIGURING METHOD, RELAY STATION, MOBILE STATION AND MOBILE COMMUNICATION SYSTEM

CROSS-REFERENCE TO RELATED APPLICATION

This application is a continuation application of International Application PCT/JP2010/001773 filed on Mar. 12, 2010 and designated the U.S., the entire contents of which are incorporated herein by reference.

FIELD

The embodiments discussed herein are related to a relay technology of radio communication between a base station and a mobile station.

BACKGROUND

In a cellular mobile communication system, an evolution from a UMTS (universal mobile telecommunication system) to an LTE (long term evolution) has been devised. In the LTE, an OFDM (orthogonal frequency division multiplexing) and an SC-FDMA (single carrier-frequency division multiple access) are adopted respectively as downlink and uplink radio access technology, thereby enabling a high-speed radio packet communication to be performed at 100 Mb/s or higher for a downlink peak transmission rate and 50 Mb/s or higher for an uplink peak transmission rate. In the 3GPP (3rd Generation Partnership Project) as an international standardization organization, a study of a mobile communication system LTE-A (LTE-Advanced) based on the LTE has been started to realize a further high-speed communication. In the LTE-A, the downlink peak transmission rate of 1 Gb/s and the uplink peak transmission rate of 500 Mb/s are aimed at, and various new techniques are studied on a radio access system, a network architecture, etc. (3GPP TR 36. 913 V8. 0. 1 (2009-03), 3rd Generation Partnership Project; Technical Specification Group Radio Access Network; Requirements for further advancements for Evolved Universal Terrestrial Radio Access (E-UTRA) (LTE-Advanced) (Release 8), 3GPP TR 36. 912 V9. 0. 0 (2009-09), 3rd Generation Partnership Project; Technical Specification group Radio Access Network; Feasibility study for Further Advancements for E-UTRA (LTE-Advanced) (Release 9) and 3GPP TS 36. 133 V9. 2. 0 (2009-12), 3rd Generation Partnership Project; Technical Specification Group Radio Access Network; Evolved Universal Terrestrial Radio Access (E-UTRA); Requirements for support of radio resource management (Release 9)). Note that, since the LTE-A is based on the LTE, it is devised to maintain backward compatibility.

As one of the methods for establishing a high-speed data communication, the method of deploying a relay station (relay node (RN)) as illustrated in FIG. 1 has been studied to support the communication between a base station and a mobile station (3GPP TR 36. 912 V9. 0. 0 (2009-09), 3rd Generation Partnership Project; Technical Specification group Radio Access Network; Feasibility study for Further Advancements for E-UTRA (LTE-Advanced) (Release 9)). The relay station relays the communication between a base station (Doner eNB or eNB) and a mobile station (user equipment (UE)), and is provided to support a high-speed data communication. As illustrated in FIG. 2, the link between the mobile station UE and the relay station RN is referred to as a Uu, and the link between the base station (eNB) and the relay station (RN) is referred to as a Un. In the following explanation, the Uu may be referred to as an access link, and the Un may be referred to as a backhaul link.

Various schemes can be implemented to embody a relay station, but for example, a repeater scheme, a decode and forward scheme, an L2 scheme, and an L3 scheme have been studied. The relay station in the repeater scheme has only the function of amplifying a radio signal (data signal and noise). The relay station in the decode and forward scheme has the function of amplifying only a data signal in the radio signal. The relay station in the L2 scheme has the function of the L2 such as a MAC layer etc. The relay station in the L3 scheme has the function of the L3 such as an RRC layer etc., and functions like a base station. The relay station in the L3 scheme is referred to as a Type1 RN in the LTE-A.

A method of evolving a relay station in to a cell is also studied. For example, a method of evolving a relay station to be provided at a cell edge to increase the throughput of the cell edge, a method of evolving a relay station to be provided in a range where radio waves do not reach from the base station locally in a cell (dead spot), etc. are studied.

When data is transmitted between the base station and the mobile station through the relay station (Type1 RN) of the L3 scheme, it is preferable that no self-interference is generated in the relay station in inband relaying in which the same frequency band is shared between the base station and the relay station, and between the relay station and the mobile station. The self-interference (or also called "loop interference") refers to interference occurring when the relay station receives DL data from the base station to the relay station and simultaneously transmits downlink data to the mobile station, and the transmission data appears in a receiver of the relay station, thereby generating interference with the data from the base station. Likewise with the uplink data, there can occur the self-interference. When the self-interference occurs, the relay station cannot correctly receive data.

To overcome the problem of the self-interference, the following policies are studied for LTE-A (3GPP TR 36. 912 V9. 0. 0 (2009-09), 3rd Generation Partnership Project; Technical Specification group Radio Access Network; Feasibility study for Further Advancements for E-UTRA (LTE-Advanced) (Release 9).

(A) Downlink: The relay station does not transmit data to the mobile station in the DL backhaul as a subframe for receiving data from an upper base station.

(B) Uplink: The relay station does not receive data from the mobile station in the UL backhaul as a subframe for transmitting data to an upper base station.

Based on the policy (A) above, as illustrated in FIG. 3, when the downlink backhaul is set between the relay station and the base station, the subframe between the relay station and the mobile station is set as an MBSFN (multicast/broadcast over single frequency network) subframe because, in the MBSFN subframe, the mobile station for the LTE does not receive unicast data. Therefore, since the mobile station UE does not receive a part of a reference signal, it is preferable because it is not necessary to make an unnecessary measurement of the reference signal in the mobile station. That is to say, the relay station can transmit a PDCCH (physical downlink control channel), a PHICH (physical hybrid ARQ indicator channel), a PCFICH (physical control format indicator channel) while it cannot transmit a PDSCH. To receive the control signal, a reference signal is arranged in the first half (CTRL section illustrated in FIG.

3) of the MBSFN subframe, but it is not arranged in the last half of the MBSFN subframe.

Based on the policy (B) above, control is performed in the relay station not to grant the mobile station permission to transmit uplink data before 4 subframes (4 ms) in the UL backhaul because if the mobile station is granted the permission to transmit uplink data before 4 ms in the uplink backhaul, the mobile station transmits data to the relay station in the uplink backhaul, which is to be avoided.

Furthermore, in the relay station, control is performed not to transmit downlink data to the mobile station before 4 subframes (4 ms) in the uplink backhaul for the following reason. That is, in the HARQ (hybrid automatic repeat request) of the LTE, it is regulated that a receiving station is to return an ACK/NACK signal in 4 ms (4 subframes) after a transmitting station transmits data. Therefore, if downlink data is transmitted to the mobile station in 4 ms in the uplink backhaul, the mobile station transmits the ACK/NACK signal to the relay station in the uplink backhaul, which is to be avoided.

In the uplink backhaul, a PUCCH (physical uplink control channel) and a PUSCH (physical uplink shared channel) as control signals to the relay station can be transmitted, but the PUCCH and the PUSCH as control signals from the mobile station cannot be transmitted.

As illustrated in 3GPP TR 36. 912 V9. 0. 0 (2009-09), 3rd Generation Partnership Project; Technical Specification group Radio Access Network; Feasibility study for Further Advancements for E-UTRA (LTE-Advanced) (Release 9), a backhaul is discussed with regard to the LTE-A. There is made a study on whether to establish downlink and uplink backhauls in which subframe of a radio Frame in the LTE-A. Suppose that a backhaul is always fixedly configured in a position of the same subframe in a radio Frame. When considering a relationship between a HARQ (Hybrid Automatic Repeat reQuest) and performance timing, there arise the following problems. These problems will be described in detail below. Suppose that in the following description, as illustrated in FIG. 4, a radio frame having a duration of 10 ms is composed of ten subframes #0 to #9 each having a duration of 1 ms as a TTI (Transmission Time Interval).

An example in the case where a backhaul is always configured in a position of the same subframe in a radio Frame will be described with reference to FIG. 5. In the continuing Frames (Frame_0, Frame_1, Frame_2, Frame_3, . . . ), FIG. 5 illustrates setting of 1 ms unit or timing of operations of (a) a downlink backhaul DL_BH, (b) a downstream access link DL_AL, (c) an uplink backhaul UL_BH, (d) an upstream access link UL_AL, and (e) HARQ processes (process numbers PID1, . . . , PID8) of access link. In FIG. 5, a downward arrow indicates transmission of a downlink signal, and an upward arrow indicates transmission of an uplink signal.

In (a) to (d) of FIG. 5, black-filled portions mean that backhauls or access links are incapable of being configured. In (a) of FIG. 5, for example, since downstream access links are used in the subframes #0, #4, #5, and #9 for transmission of control data, the downlink backhauls are incapable of being configured in these subframes. Therefore, in this example, downlink backhauls are configured in the subframes #1 in all of the continuing Frames. In the specifications of the LTE, since an ACK/NACK signal is sent back after 4 ms of data transmission, the relay station RN sends back the ACK/NACK signal to the subframe #5 with respect to the data transmission through the base station eNB in the subframe #1. As a result, in (c) of FIG. 5, the uplink backhauls are configured in the subframes #5. In (a) and (c) of FIG. 5, durations of the downlink or uplink backhauls are highlighted by solid thick frame lines.

When the downlink backhauls are configured in the subframes #1 and the uplink backhauls are configured in the subframes #5, access links are incapable of being configured in the same subframes. Therefore, as illustrated in (b) and (d) of FIG. 5, portions of the subframes #1 are displayed (incapable of being configured) to be black-filled in the downstream access links. On the other hand, portions of the subframes #5 are displayed to be black-filled (incapable of being configured) in the upstream access links.

There are two problems in the case where a backhaul is always configured in a position of the same subframe in one Frame as illustrated in FIG. 5.

First, a first problem is that backward compatibility with the LTE is lost. As described above, in the specifications of the LTE, an ACK/NACK signal is sent back after 4 ms of the data transmission. However, when the backhaul is configured as illustrated in FIG. 5, the ACK/NACK signal is to be sent back after 6 ms, and therefore the specifications of the LTE are not satisfied. In the example of FIG. 5, the ACK/NACK signal from the base station eNB toward the data transmission through the uplink backhaul (subframe #5) corresponds to the downlink backhaul (subframe #1) of the next Frame. However, when the backward compatibility with the LTE need not be maintained with regard to the reply timing of the HARQ, the above matter does not become a big problem.

Next, a second problem is as follows. That is, in the configuration of the backhaul illustrated in FIG. 5, a HARQ process in which the HARQ of an access link is incapable of being performed and duration of the HARQ process are scattered. Therefore, effective scheduling of the access link becomes difficult in the relay station RN.

In the example illustrated in FIG. 5, a part (four portions; illustrated by thick lines) of the HARQ processes of the process numbers PID2, PID4, PID6, and PID8 are incapable of being used. Specifically, in the HARQ processes of the process numbers PID2, PID4, PID6, and PID8, timing points of the uplink data transmission are matched with the uplink backhauls of the Frame_2, Frame_3, Frame_0, and Frame_1, respectively, and therefore the access links are incapable of being used. Accordingly, in the case of performing new data transmission, particular duration scattered as illustrated in FIG. 5 of the HARQ process in which the HARQ is incapable of being performed are avoided and scheduling is to be configured. As a result, there are problems that complexity of the scheduling is increased and the efficiency of the access link is reduced.

SUMMARY

According to an aspect, there is provided a communication duration configuring method for use in a mobile communication system including a relay station which relays radio communication between a base station and a mobile station. The communication duration configuring method includes: configuring at least one of a downlink communication duration in which the relay station receives a transmission signal from the base station in a duration in which a transmission subframe from the relay station to the mobile station is configured as an MBSFN subframe and an uplink communication duration in which the relay station transmits a transmission signal to the base station while limiting transmission of a signal from the mobile station to the relay station; providing a plurality of communication processes in which communication processing including data transmission and an acknowledgment after a predetermined time period from the data transmission is managed on an access link between the mobile station and the relay station; making it possible to configure the uplink communication duration at timing according to the timing of uplink data transmission of a particular communication process among the plurality of communication processes; and configuring a downlink communication duration after a predetermined time period of each of configured uplink communication durations.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates a configuration guideline of a known backhaul;

FIGS. 8A to 8H illustrate one example of a backhaul configuring method according to a second embodiment;

FIGS. 9A and 9B tabulate backhauls configured by a backhaul configuring method exemplified in FIGS. 8A to 8H;

FIGS. 10A to 10H illustrate one example of a backhaul configuring method according to a third embodiment;

FIGS. 11A and 11B tabulate backhauls configured by a backhaul configuring method exemplified in FIGS. 10A to 10H;

DESCRIPTION OF EMBODIMENTS

A plurality of embodiments will be described below. In the following description, a Donor eNB, a Relay Node, and User Equipment are appropriately abbreviated as a base station eNB, an RN, and a mobile station UE, respectively. The base station eNB according to the present embodiment is a Donor eNB which supports a backhaul between its own station and the relay station RN. Further, a HARQ is appropriately referred to as one indicating processing (first communication processing) including data transmission and an acknowledgment after a predetermined time from the data transmission.

In the following description, a backhaul duration represents one duration unit or a plurality of duration units among a plurality of duration units configured in a TTI (Transmission Time Interval) unit in a single radio Frame. In the present embodiment, the TTI is configured as time of a subframe (1 ms) unit. "Configuring a backhaul" means that a backhaul is configured or identified as a subframe in the radio frame. Note that also in the case where the TTI is not time of a subframe unit, the present embodiment is applicable.

(1) First Embodiment

A backhaul configuring method according to a first embodiment will be described below.

The backhaul configuring method according to the present embodiment is a method of a case where backward compatibility with the LTE is maintained with regard to reply timing of the HARQ. Specifically, with regard to the reply timing of the HARQ, an ACK/NACK signal (A/N; acknowledgment) is here assumed to be sent back after 4 ms of the data transmission. In this backhaul configuring method, it is intended that complexity of scheduling is reduced and efficiency of an access link is improved in such a manner that the number of HARQ processes (communication processes) incapable of being partly used is reduced as much as possible.

First, a configuration condition at the time of the backhaul configuring method according to the present embodiment will be described with reference to FIG. 6. A format of FIG. 6 is the same as that of the above-described FIG. 5.

Figure 6:
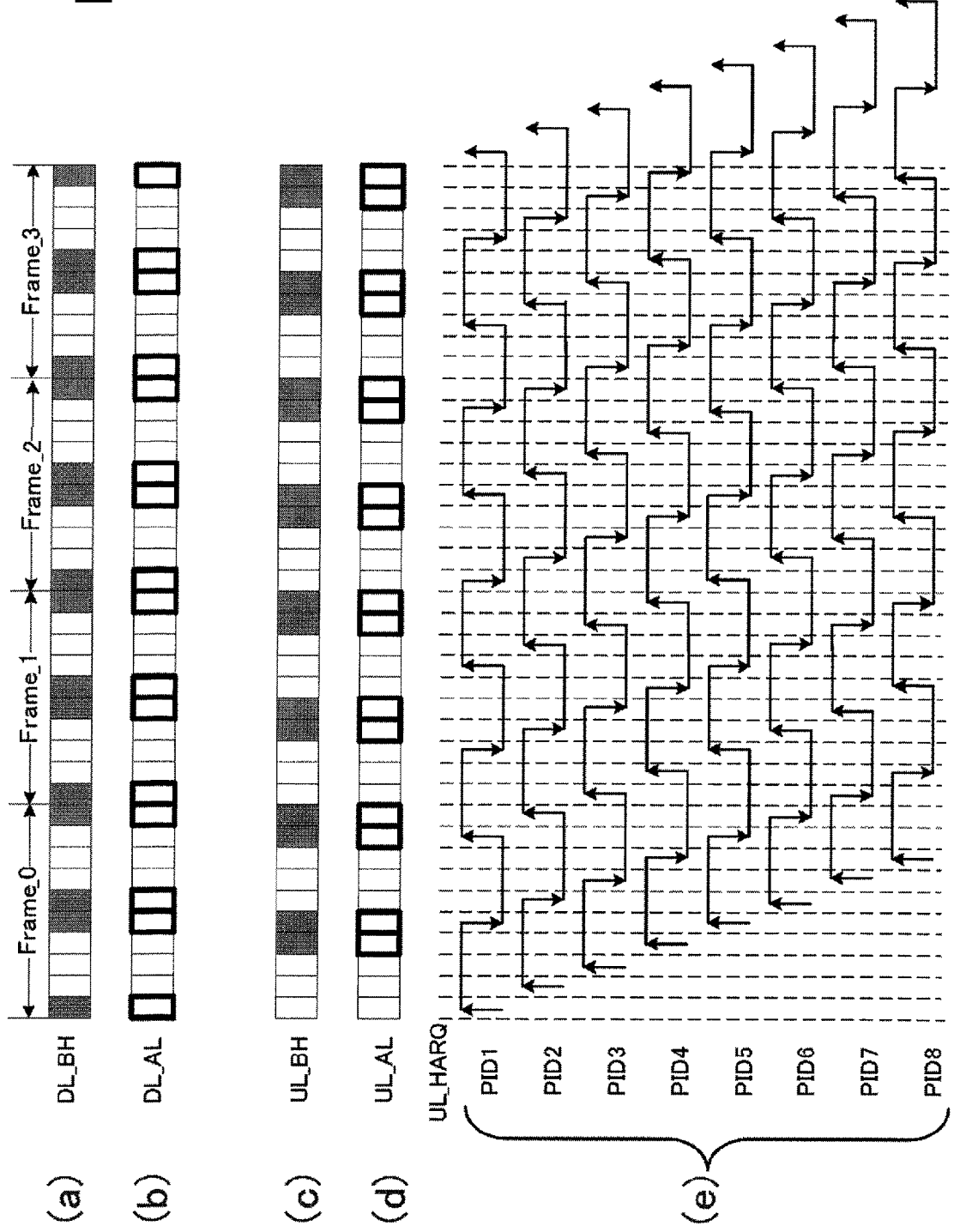
FIG. 6 illustrates a configuration condition of a backhaul configuring method according to a first embodiment.

Specifically, in FIG. 6, configurations of 1 ms unit or timing points of operations in each of (a) a downlink backhaul DL_BH, (b) a downstream access link DL_AL, (c) an uplink backhaul UL_BH, (d) an upstream access link UL_AL, and (e) a HARQ process (process numbers PID1, . . . , PID8) as a communication process of an access link are illustrated in continuing Frames (Frame_0, Frame_1, Frame_2, Frame_3, . . . ). In FIG. 6, a downward arrow indicates transmission of a downlink signal, and an upward arrow indicates transmission of an uplink signal, respectively.

In (a) to (d) of FIG. 6, black-filled portions each mean that a backhaul link or access link is incapable of being configured. On the other hand, in (a) to (d) of FIG. 6, subframes surrounded by solid thick frame lines each mean that a backhaul or access link is secured in the subframe.

Specifically, in the LTE, since the subframes #0, #4, #5, and #9 are used for a Primary Synchronization Channel, Paging, Secondary Synchronization Channel, and Paging in the downstream access link, respectively, the downlink backhaul is incapable of being configured in these subframes. Therefore, in the downlink backhaul DL_BH, the subframes #0, #4, #5, and #9 are black-filled in respective Frames, and in the downstream access link DL_AL, the subframes #0, #4, #5, and #9 are surrounded by solid thick frame lines in respective Frames. Further, after 4 ms of the transmission from the relay station RN on the downstream access links of the subframes #0, #4, #5, and #9, the upstream access link for a reply of the ACK/NACK signal (A/N) is used. Therefore, in the upstream access link UL_AL, the subframes #4, #8, #9, and #3 are surrounded by solid thick frame lines in respective Frames. In the uplink backhaul UL_BH, the subframes #4, #8, #9, and #3 are black-filled in respective Frames.

Based on the configuration condition at the time of the backhaul configuring method illustrated in FIG. 6, the backhaul configuring method according to the present embodiment will be specifically described with reference to FIGS. 7A to 7H. Formats of FIGS. 7A to 7H are the same as that of FIG. 6. FIGS. 7A to 7H illustrate a case where the HARQ processes of the process numbers PID1 to PID8 are configured as a HARQ process in which a HARQ is incapable of being at least partly used. In FIGS. 7A to 7H, timing at which the HARQ is incapable of being performed is illustrated by thick lines.

Figure 7A:
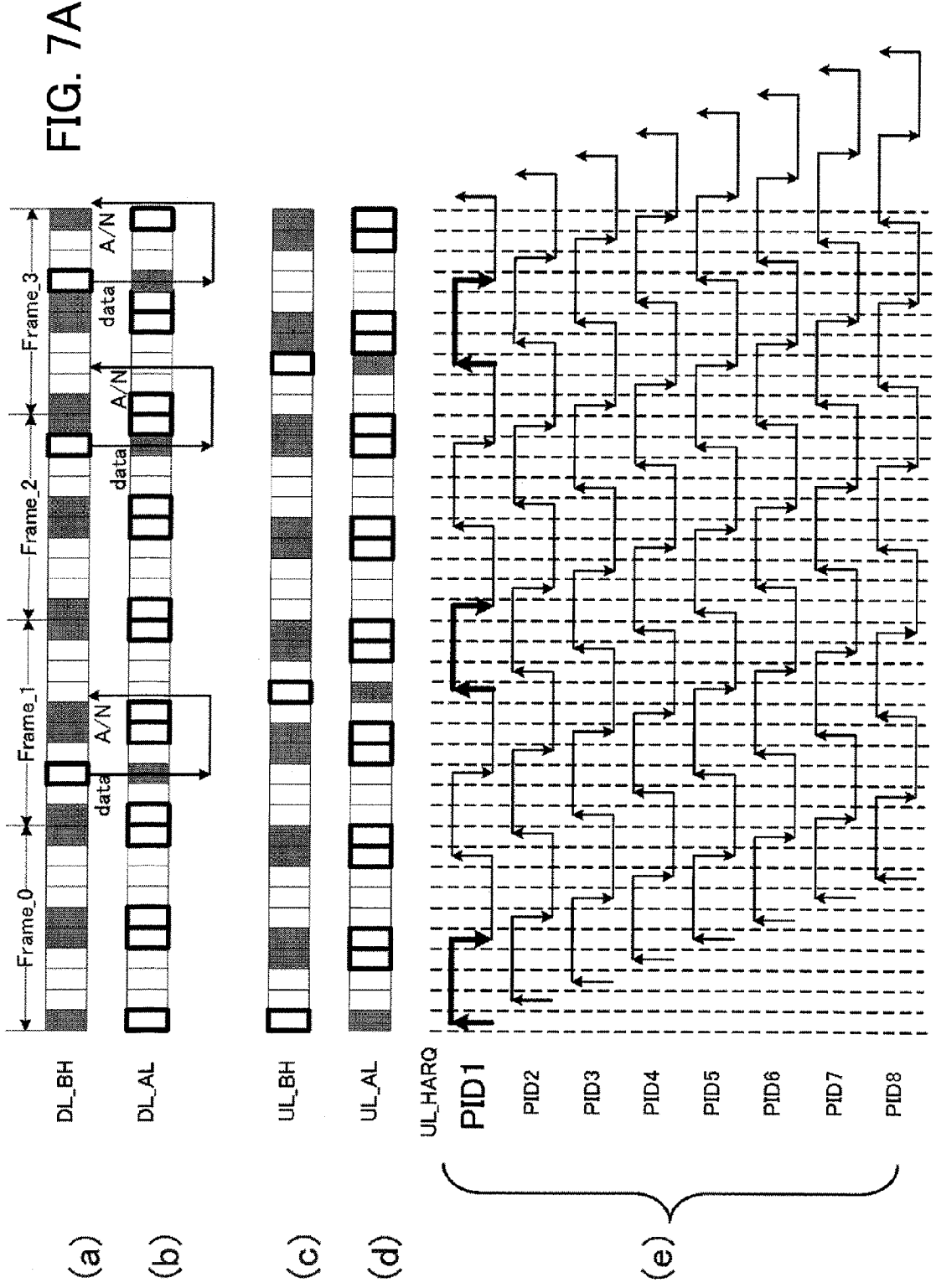
FIGS. 7A to 7H illustrate one example of a backhaul configuring method according to a first embodiment.

FIG. 7A illustrates the backhaul configuring method in the case where only the HARQ process of the process number PID1 is configured as a HARQ process in which a HARQ is incapable of being partly performed among the HARQ processes of the process numbers PID1 to PID8. That is, the HARQ process in which the HARQ is incapable of being partly performed is limited to the HARQ process of the process number PID1.

In FIG. 7A, the downlink backhauls of three times are secured among the continuing four Frames. Specifically, in FIG. 7A, the downlink backhauls are configured in a subframe #2 of the Frame_1, the subframe #8 of the Frame_2, and a subframe #6 of the Frame_3. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal is sent back from the relay station RN. Therefore, the uplink backhauls are configured in the subframe #6 of the Frame_1, the subframe #2 of the Frame_3, and the subframe #0 of the Frame_0.

On this uplink backhaul, an upstream access link is incapable of being used. As illustrated in (e) of FIG. 7A, all the HARQs (performance timing of thick lines) incapable of being performed belong to the same HARQ process (namely, the process number PID1).

Figure 7B:
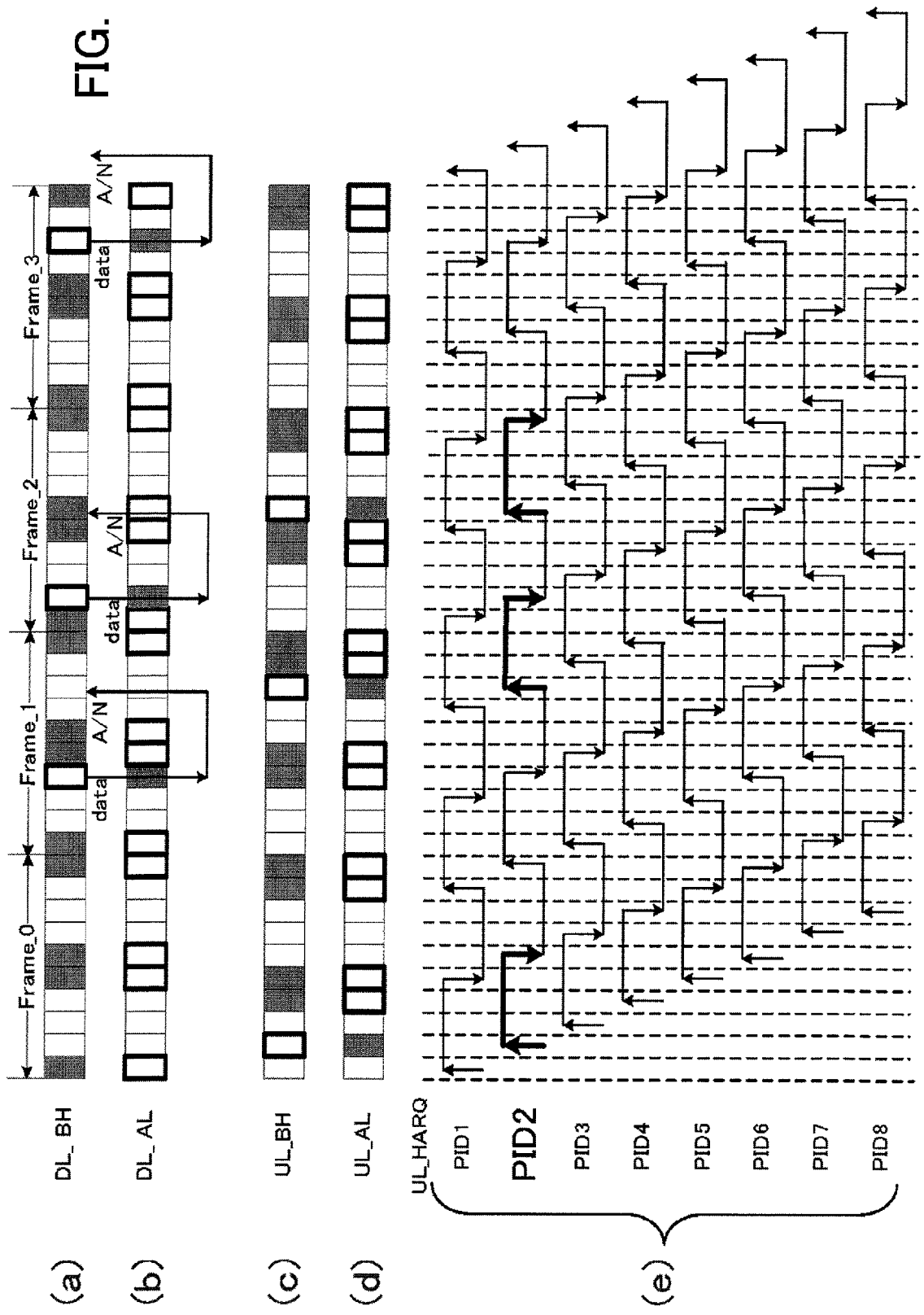

FIG. 7B illustrates the backhaul configuring method in the case where only the HARQ process of the process number PID2 is configured as a HARQ process in which a HARQ is incapable of being partly performed among the HARQ processes of the process numbers PID1 to PID8. That is, a HARQ process in which the HARQ is incapable of being partly performed is limited to the HARQ process of the process number PID2.

In FIG. 7B, the downlink backhauls of three times are secured among the four continuing Frames. Specifically, in FIG. 7B, the downlink backhauls are configured in the subframe #3 of the Frame_1, a subframe #1 of the Frame_2, and a subframe #7 of the Frame_3. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal (A/N) is sent back from the relay station RN. Therefore, the uplink backhauls are configured in the subframe #1 of the Frame_0, the subframe #7 of the Frame_1, and the subframe #5 of the Frame_2.

On this uplink backhaul, an upstream access link is incapable of being used. As illustrated in (e) of FIG. 7B, all the HARQs (performance timing of thick lines) incapable of being performed belong to the same HARQ process (namely, the process number PID2).

Figure 7C:
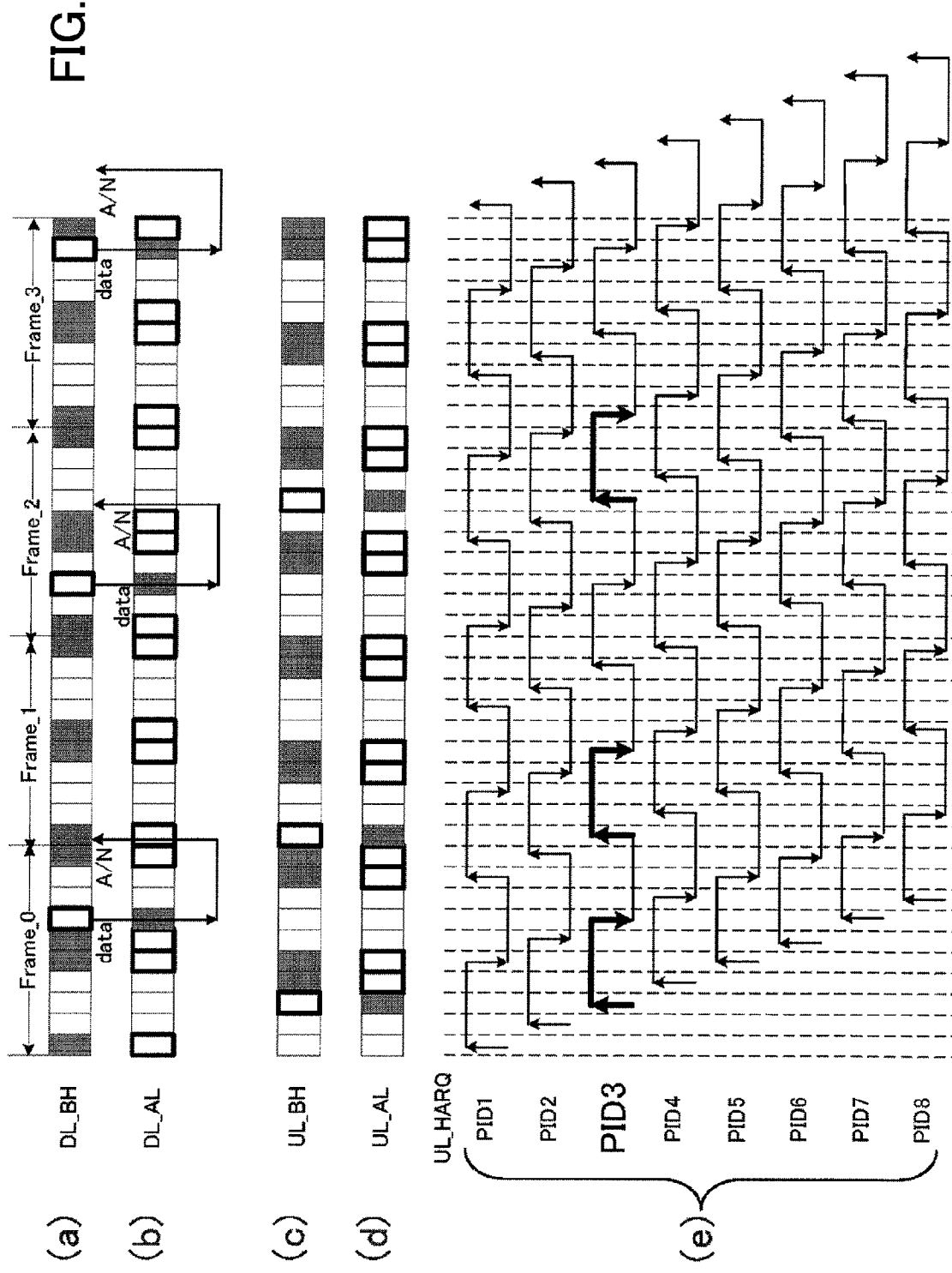

FIG. 7C illustrates the backhaul configuring method in the case where only the HARQ process of the process number PID3 is configured as a HARQ process in which a HARQ is incapable of being partly performed among the HARQ processes of the process numbers PID1 to PID8. That is, a HARQ process in which the HARQ is incapable of being partly performed is limited to the HARQ process of the process number PID3.

In FIG. 7C, the downlink backhauls of three times are secured among the four continuing Frames. Specifically, in FIG. 7C, the downlink backhauls are configured in the subframe #6 of the Frame_0, the subframe #2 of the Frame_2, and the subframe #8 of the Frame_3. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal is sent back from the relay station RN. Therefore, the uplink backhauls are configured in the subframe #2 of the Frame_0, the subframe #0 of the Frame_1, and the subframe #6 of the Frame_2.

On this uplink backhaul, an upstream access link is incapable of being used. As illustrated in (e) of FIG. 7C, all the HARQs (performance timing of thick lines) incapable of being performed belong to the same HARQ process (namely, the process number PID3).

Figure 7D:
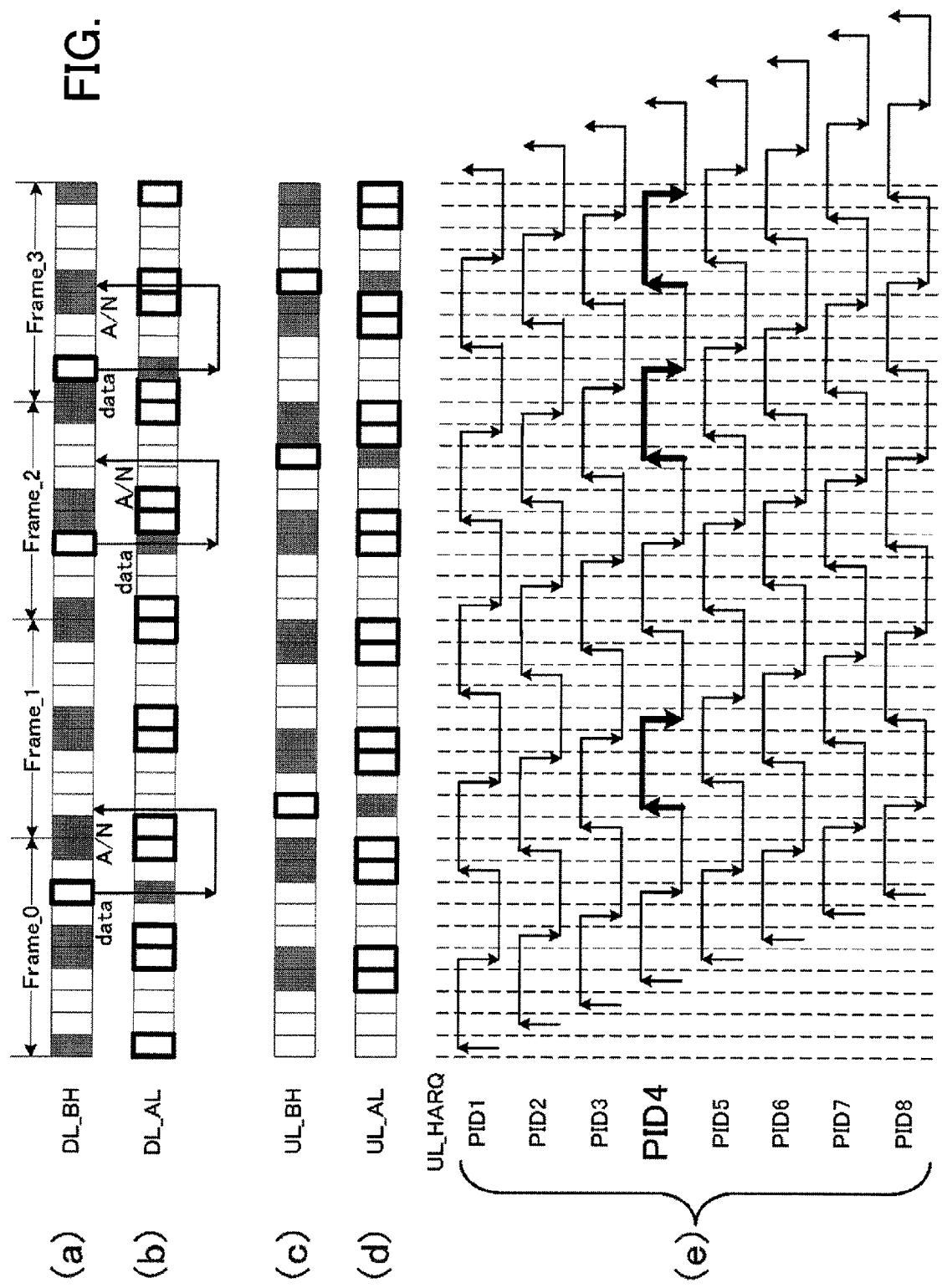

FIG. 7D illustrates the backhaul configuring method in the case where only the HARQ process of the process number PID4 is configured as a HARQ process in which a HARQ is incapable of being partly performed among the HARQ processes of the process numbers PID1 to PID8. That is, a HARQ process in which the HARQ is incapable of being partly performed is limited to the HARQ process of the process number PID4.

In FIG. 7D, the downlink backhauls of three times are secured among the four continuing Frames. Specifically, in FIG. 7D, the downlink backhauls are configured in the subframe #7 of the Frame_0, the subframe #3 of the Frame_2, and the subframe #1 of the Frame_3. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal is sent back from the relay station RN. Therefore, the uplink backhauls are configured in the subframe #1 of the Frame_1, the subframe #7 of the Frame_2, and the subframe #5 of the Frame_3.

On this uplink backhaul, an upstream access link is incapable of being used. As illustrated in (e) of FIG. 7D, all the HARQs (performance timing of thick lines) incapable of being performed belong to the same HARQ process (namely, the process number PID4).

Figure 7E:
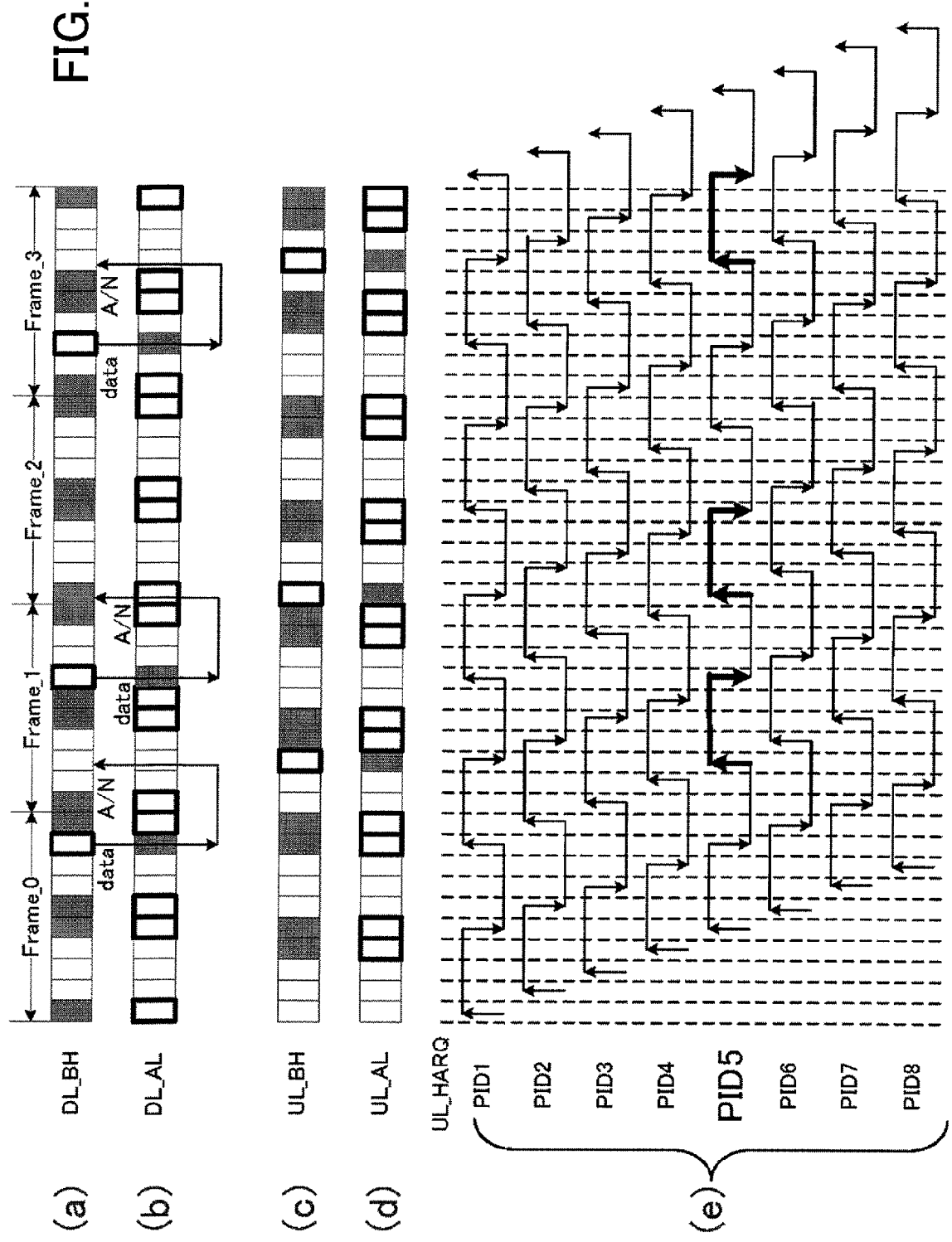

FIG. 7E illustrates the backhaul configuring method in the case where only the HARQ process of the process number PID5 is configured as a HARQ process in which a HARQ is incapable of being partly performed among the HARQ processes of the process numbers PID1 to PID8. That is, a HARQ process in which the HARQ is incapable of being partly performed is limited to the HARQ process of the process number PID5.

In FIG. 7E, the downlink backhauls of three times are secured among the four continuing Frames. Specifically, in FIG. 7E, the downlink backhauls are configured in the subframe #8 of the Frame_0, a subframe #6 of the Frame_1, and a subframe #2 of the Frame_3. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal is sent back from the relay station RN. Therefore, the uplink backhauls are configured in the subframe #2 of the Frame_1, the subframe #0 of the Frame_2, and the subframe #6 of the Frame_3.

On this uplink backhaul, an upstream access link is incapable of being used. As illustrated in (e) of FIG. 7E, all the HARQs (performance timing of thick lines) incapable of being performed belong to the same HARQ process (namely, the process number PID5).

Figure 7F:
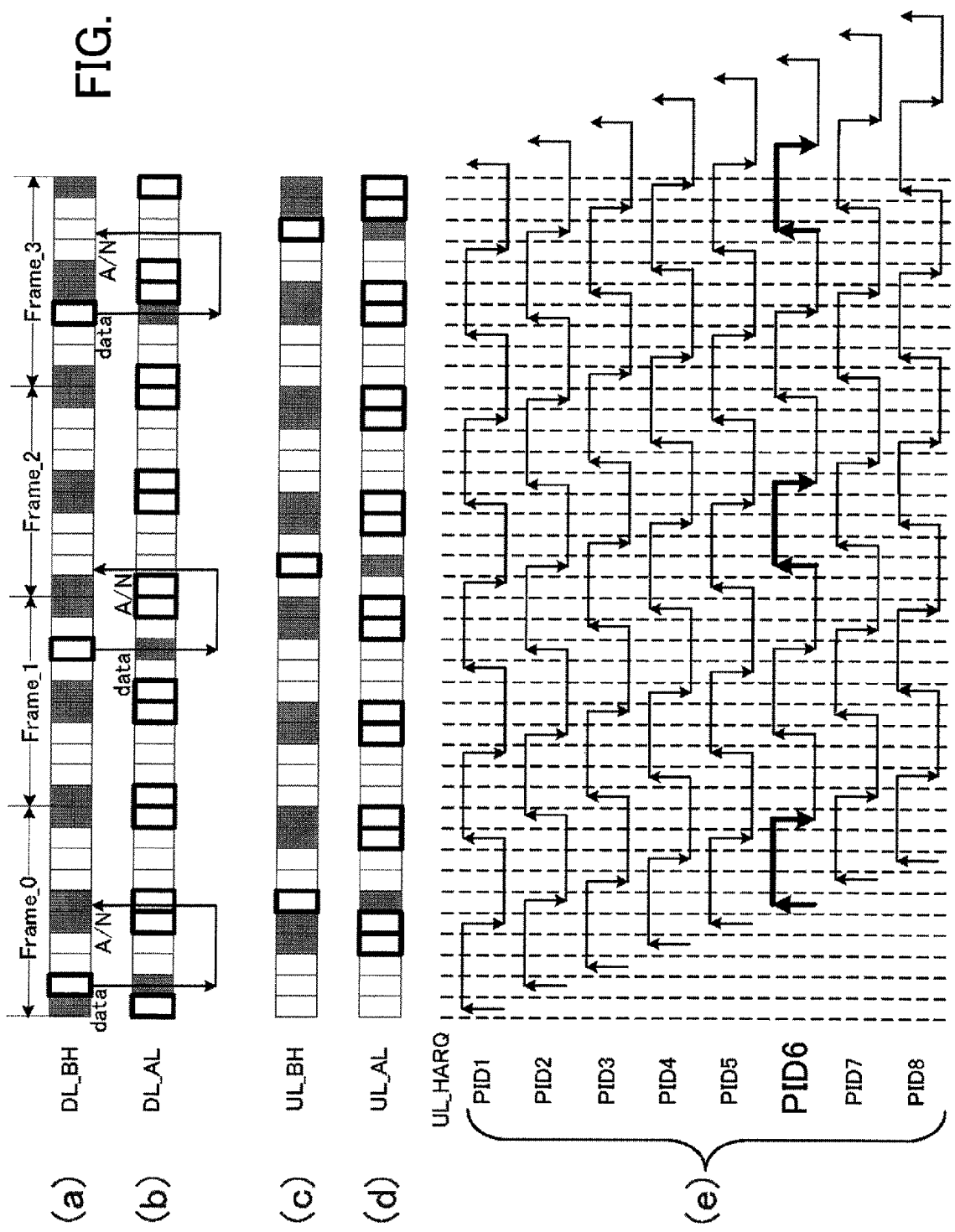

FIG. 7F illustrates the backhaul configuring method in the case where only the HARQ process of the process number PID6 is configured as a HARQ process in which a HARQ is incapable of being partly performed among the HARQ processes of the process numbers PID1 to PID8. That is, a HARQ process in which the HARQ is incapable of being partly performed is limited to the HARQ process of the process number PID6.

In FIG. 7F, the downlink backhauls of three times are secured among the four continuing Frames. Specifically, in FIG. 7F, the downlink backhauls are configured in the subframe #1 of the Frame_0, the subframe #7 of the Frame_1, and the subframe #3 of the Frame_3. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal is sent back from the relay station RN. Therefore, the uplink backhauls are configured in the subframe #5 of the Frame_0, the subframe #1 of the Frame_2, and the subframe #7 of the Frame_3.

On this uplink backhaul, an upstream access link is incapable of being used. As illustrated in (e) of FIG. 7F, all the HARQs (performance timing of thick lines) incapable of being performed belong to the same HARQ process (namely, the process number PID6).

Figure 7G:
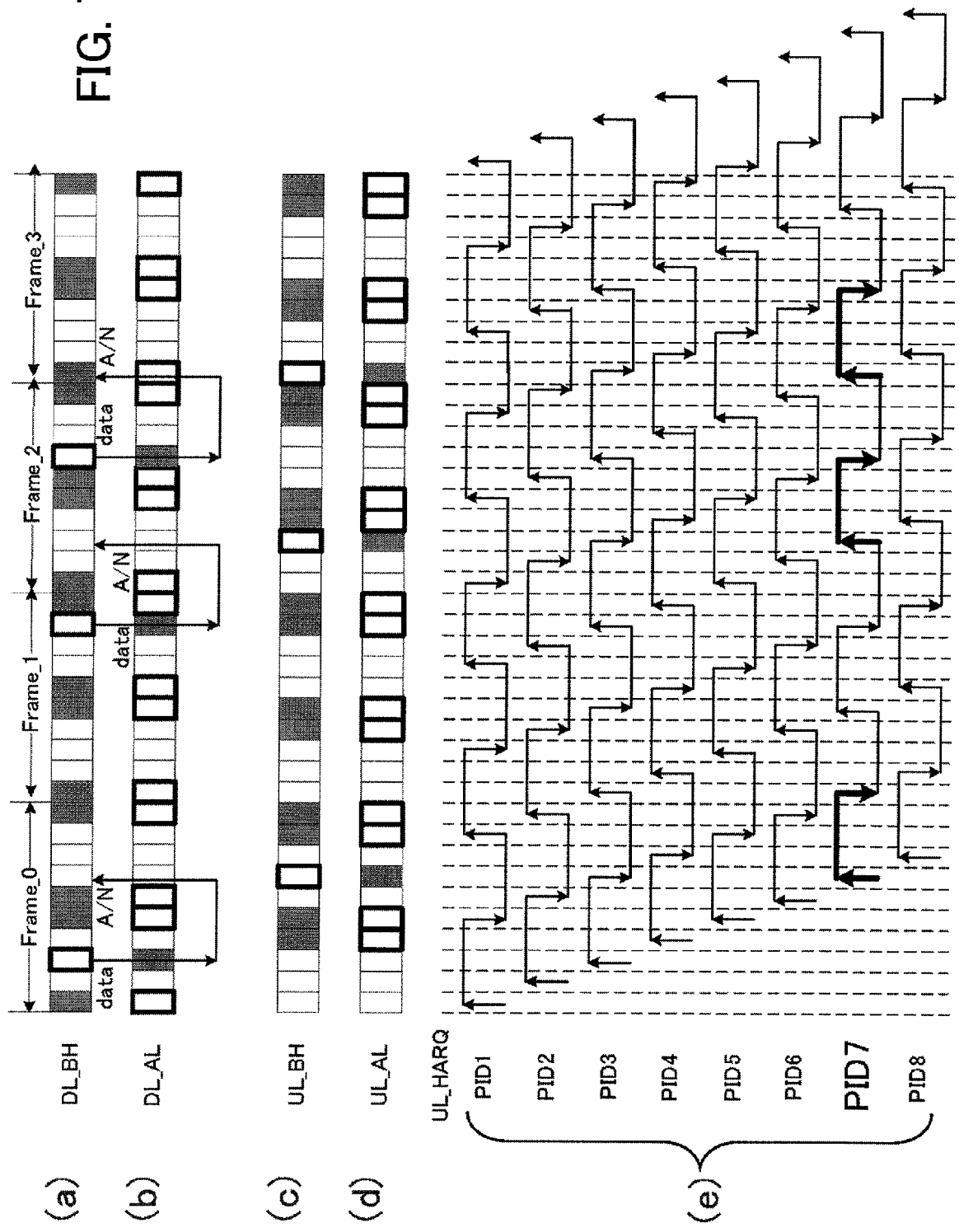

FIG. 7G illustrates the backhaul configuring method in the case where only the HARQ process of the process number PID7 is configured as a HARQ process in which a HARQ is incapable of being partly performed among the HARQ processes of the process numbers PID1 to PID8. That is, a HARQ process in which the HARQ is incapable of being partly performed is limited to the HARQ process of the process number PID7.

In FIG. 7G, the downlink backhauls of three times are secured among the four continuing Frames. Specifically, in FIG. 7G, the downlink backhauls are configured in the subframe #2 of the Frame_0, the subframe #8 of the Frame_1, and the subframe #6 of the Frame_2. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal is sent back from the relay station RN. Therefore, the uplink backhauls are configured in the subframe #6 of the Frame_0, the subframe #2 of the Frame_2, and the subframe #0 of the Frame_3.

On this uplink backhaul, an upstream access link is incapable of being used. As illustrated in (e) of FIG. 7G, all the HARQs (performance timing of thick lines) incapable of being performed belong to the same HARQ process (namely, the process number PID7).

Figure 7H:
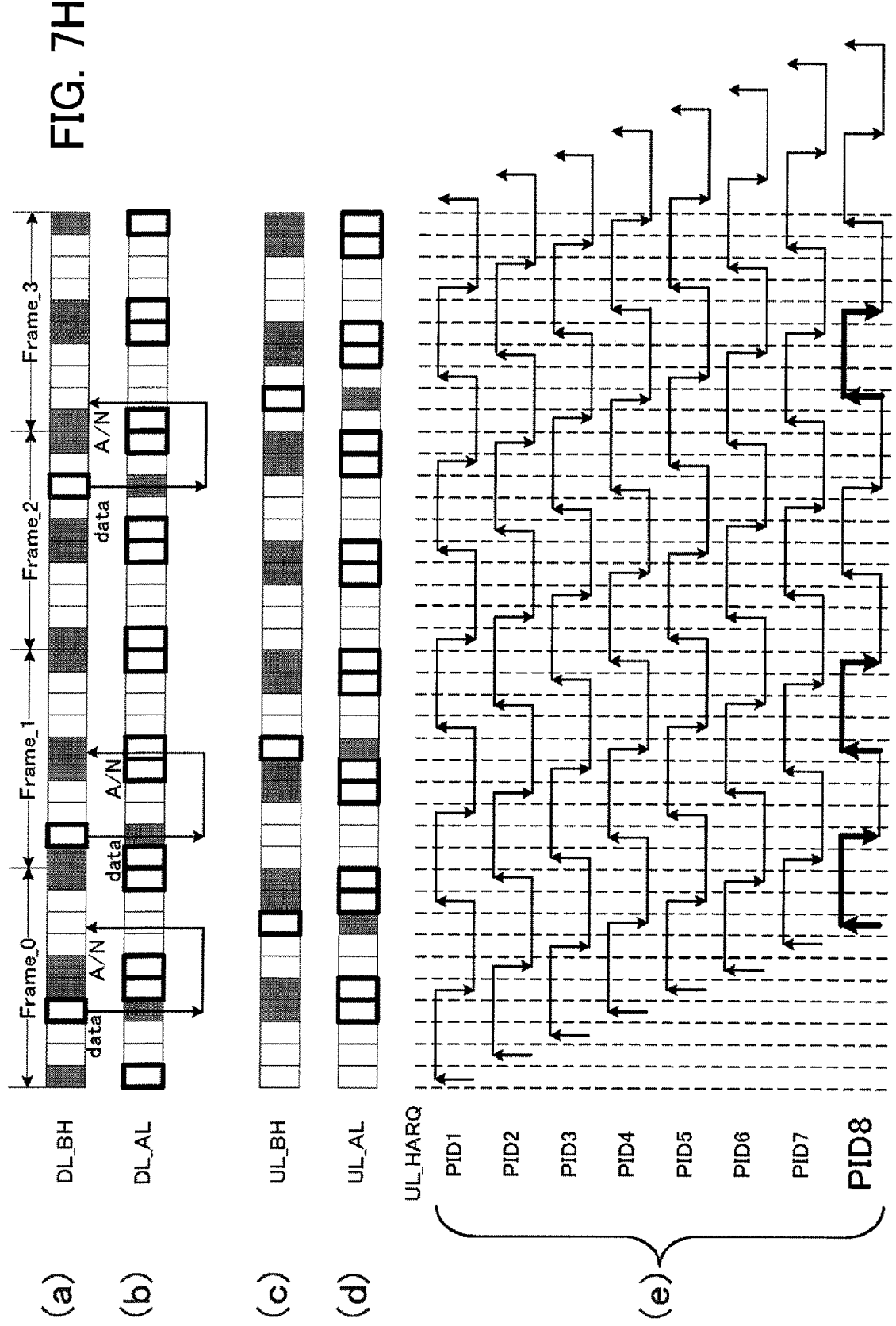

FIG. 7H illustrates the backhaul configuring method in the case where only the HARQ process of the process number PID8 is configured as a HARQ process in which a HARQ is incapable of being partly performed among the HARQ processes of the process numbers PID1 to PID8. That is, a HARQ process in which the HARQ is incapable of being partly performed is limited to the HARQ process of the process number PID8.

In FIG. 7H, the downlink backhauls of three times are secured among the four continuing Frames. Specifically, in FIG. 7H, the downlink backhauls are configured in the subframe #3 of the Frame_0, the subframe #1 of the Frame_1, and a subframe #7 of the Frame_2. Also, in the same positions as in the above also in Frames continuous with the Frame_0 to Frame_3, the downlink backhauls are configured. After 4 ms of the data transmission from the base station eNB on the thus configured downlink backhaul, the ACK/NACK signal is sent back from the relay station RN. Therefore, the uplink backhauls are configured in the subframe #7 of the Frame_0, the subframe #5 of the Frame_1, and the subframe #1 of the Frame_3.

On this uplink backhaul, an upstream access link is incapable of being used. As illustrated in (e) of FIG. 7H, all the HARQs (performance timing of thick lines) incapable of being performed belong to the same HARQ process (namely, the process number PID8).

As described above, in the backhaul configuring method according to the present embodiment, the backhaul is configured in such a manner that the HARQ process in which the HARQ on an upstream access link is incapable of being partly performed is limited to one HARQ process. Accordingly, although the configuration frequency (three times among four Frames) of the backhaul is relatively small, the HARQ process in which the HARQ on the upstream access link is incapable of being partly performed is integrated. Further, the complexity of the scheduling is reduced, and the efficiency of the access link is improved.

(2) Second Embodiment

A backhaul configuring method according to a second embodiment will be described below.

The backward configuring method according to the present embodiment is a method of a case where backward compatibility with the LTE is maintained with regard to reply timing of the HARQ. Specifically, with regard to the reply timing of the HARQ, an ACK/NACK signal is here assumed to be sent back after 4 ms of data transmission. The present embodiment differs from the first embodiment in that the configuration frequency of the backhaul is increased. Through the process, as compared with the first embodiment, while the configuration frequency of the backhaul is more increased, the efficiency of the access link is maintained.

The backhaul configuring method according to the present embodiment will be specifically described below with reference to FIGS. 8A to 8H. Formats of FIGS. 8A to 8H are the same as that of FIG. 6. FIGS. 8A to 8H illustrate a case where each of the HARQ processes of the process numbers PID1 to PID8 is a HARQ process in which the HARQ is incapable of being performed at all timing points. FIGS. 8A to 8H further illustrate by thick lines the timing at which the HARQ is incapable of being performed. In contradiction to the configuration conditions illustrated in FIG. 6, in FIGS. 8A to 8H, portions of subframes incapable of being used as the upstream access link are displayed to be black-filled by dotted thick frame lines.

In the backhaul configuring method illustrated in FIGS. 8A to 8H, a downlink backhaul is each added to the backhaul configuring method illustrated in FIGS. 7A to 7H, thereby securing the downlink backhaul of one time in each Frame. Further, in the backhaul configuring method illustrated in FIGS. 8A to 8H, the HARQ process in which the HARQ is incapable of being performed at all the timing points is each configured, thereby securing the number of the uplink backhauls more.

In the backhaul configuring method illustrated in FIG. 8A, as compared with that illustrated in FIG. 7A, the downlink backhaul is newly added and configured in the subframe #8 of the Frame_0. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #2 of the Frame_1 for sending back the ACK/NACK signal from the relay station RN.

As the HARQ process in which the HARQ is incapable of being performed at all the timing points, when the HARQ process of the process number PID1 is further configured, the number of the uplink backhauls is more secured. Specifically, correspondingly to the upstream access link in the HARQ process of the process number PID1, the uplink backhauls are configured in the subframe #8 of the Frame_0 and the subframe #4 of the Frame_2. In the added and configured downlink backhaul (the subframe #8 of the Frame_0), the uplink backhaul is further configured in the subframe #4 of the Frame_0 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8A, the HARQ process in which the HARQ is incapable of being performed is integrated into a part of the HARQ processes (the PID1 and the PID5 shifted by 4 ms from the PID1). Through the process, the downlink backhauls of four times and the uplink backhauls of seven times are capable of being configured for every four Frames.

Figure 8B:
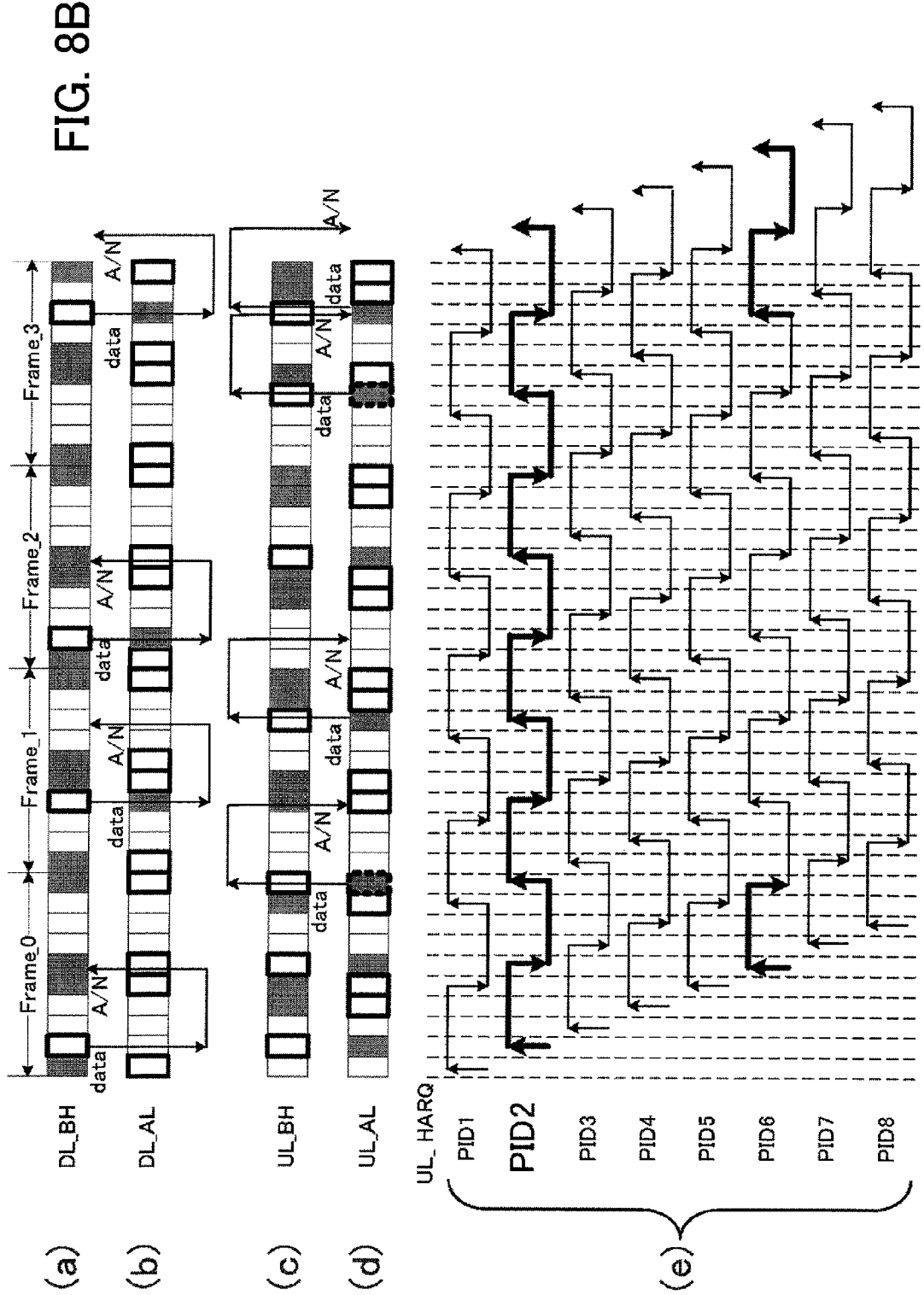

In the backhaul configuring method illustrated in FIG. 8B, as compared with that illustrated in FIG. 7B, the downlink backhaul is newly added and configured in the subframe #1 of the Frame_0. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #5 of the Frame_0 for sending back the ACK/NACK signal from the relay station RN.

As the HARQ process in which the HARQ is incapable of being performed at all the timing points, when the HARQ process of the process number PID2 is further configured, the number of the uplink backhauls is more secured. Specifically, correspondingly to the upstream access link in the HARQ process of the process number PID2, the uplink backhauls are configured in the subframe #9 of the Frame_0 and the subframe #3 of the Frame_3. In the added and configured downlink backhaul (the subframe #1 of the Frame_0), the uplink backhaul is further configured in the subframe #7 of the Frame_3 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8B, the HARQ process in which the HARQ is incapable of being performed is integrated into a part of the HARQ processes (the PID2, and the PID6 shifted by 4 ms from the PID2). Through the process, the downlink backhauls of four times and the uplink backhauls of seven times are capable of being configured for every four Frames.

In the backhaul configuring method illustrated in FIG. 8C, as compared with that illustrated in FIG. 7C, the downlink backhaul is newly added and configured in the subframe #8 of the Frame_1. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #2 of the Frame_2 for sending back the ACK/NACK signal from the relay station RN.

As the HARQ process in which the HARQ is incapable of being performed at all the timing points, when the HARQ process of the process number PID3 is further configured, the number of the uplink backhauls is more secured. Specifically, correspondingly to the upstream access link in the HARQ process of the process number PID3, the uplink backhauls are configured in the subframe #8 of the Frame_1 and the subframe #4 of the Frame_3. In the added and configured downlink backhaul (the subframe #8 of the Frame_1), the uplink backhaul is further configured in the subframe #4 of the Frame_1 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8C, the HARQ process in which the HARQ is incapable of being performed is integrated into a part of the HARQ processes (the PID3, and the PID7 shifted by 4 ms from the PID3). Through the process, the downlink backhauls of four times and the uplink backhauls of seven times are capable of being configured for every four Frames.

Figure 8D:
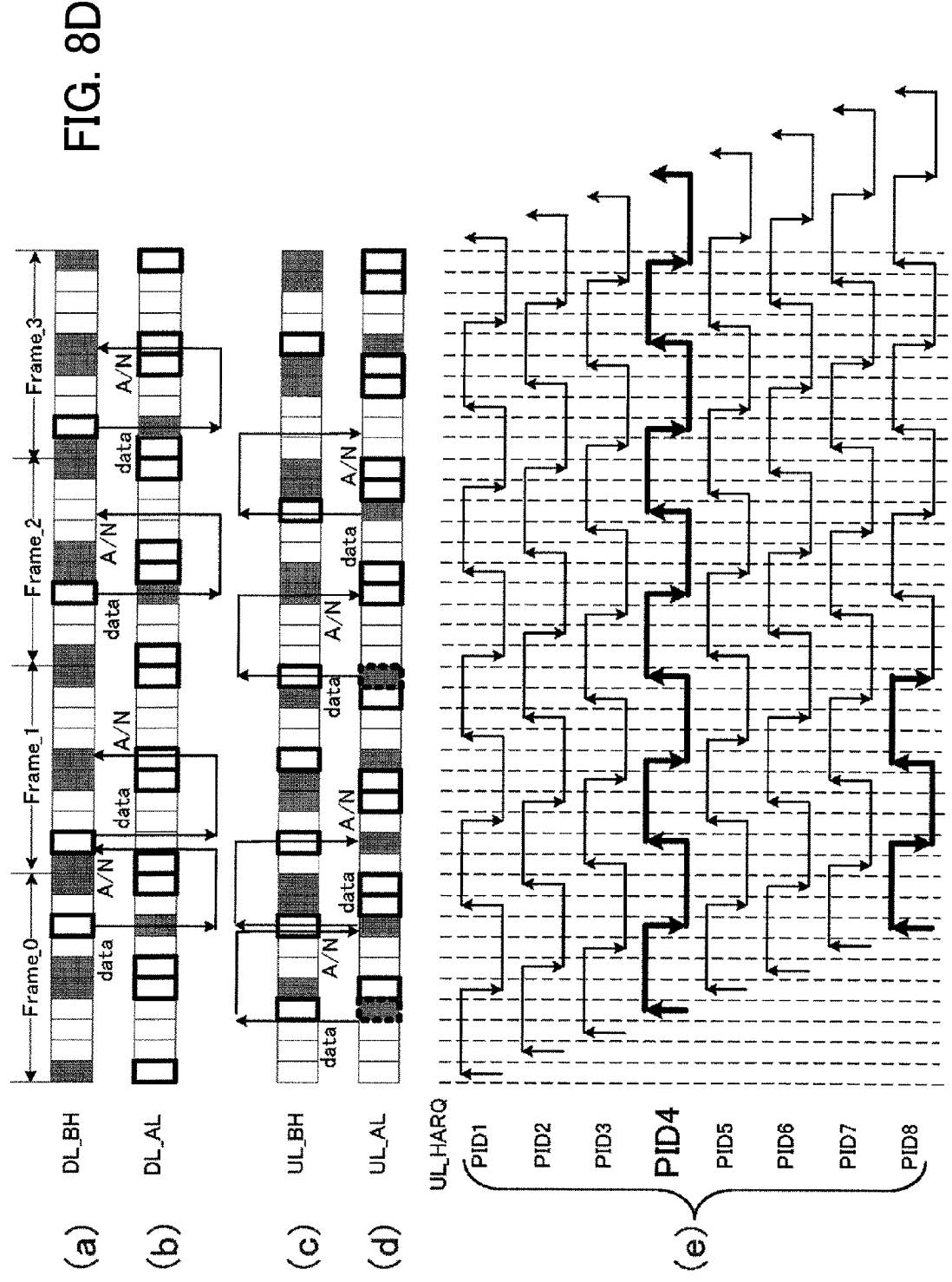

In the backhaul configuring method illustrated in FIG. 8D, as compared with that illustrated in FIG. 7D, the downlink backhaul is newly added and configured in the subframe #1 of the Frame_1. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #5 of the Frame_1 for sending back the ACK/NACK signal from the relay station RN.

As the HARQ process in which the HARQ is incapable of being performed at all the timing points, when the HARQ process of the process number PID4 is further configured, the number of the uplink backhauls is more secured. Specifically, correspondingly to the upstream access link in the HARQ process of the process number PID4, the uplink backhauls are configured in the subframe #3 of the Frame_0 and the subframe #9 of the Frame_1. In the added and configured downlink backhaul (the subframe #1 of the Frame_1), the uplink backhaul is further configured in the subframe #7 of the Frame_0 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8D, the HARQ process in which the HARQ is incapable of being performed is integrated into a part of the HARQ processes (the PID4, and the PID8 shifted by 4 ms from the PID4). Through the process, the downlink backhauls of four times and the uplink backhauls of seven times are capable of being configured for every four Frames.

Figure 8E:
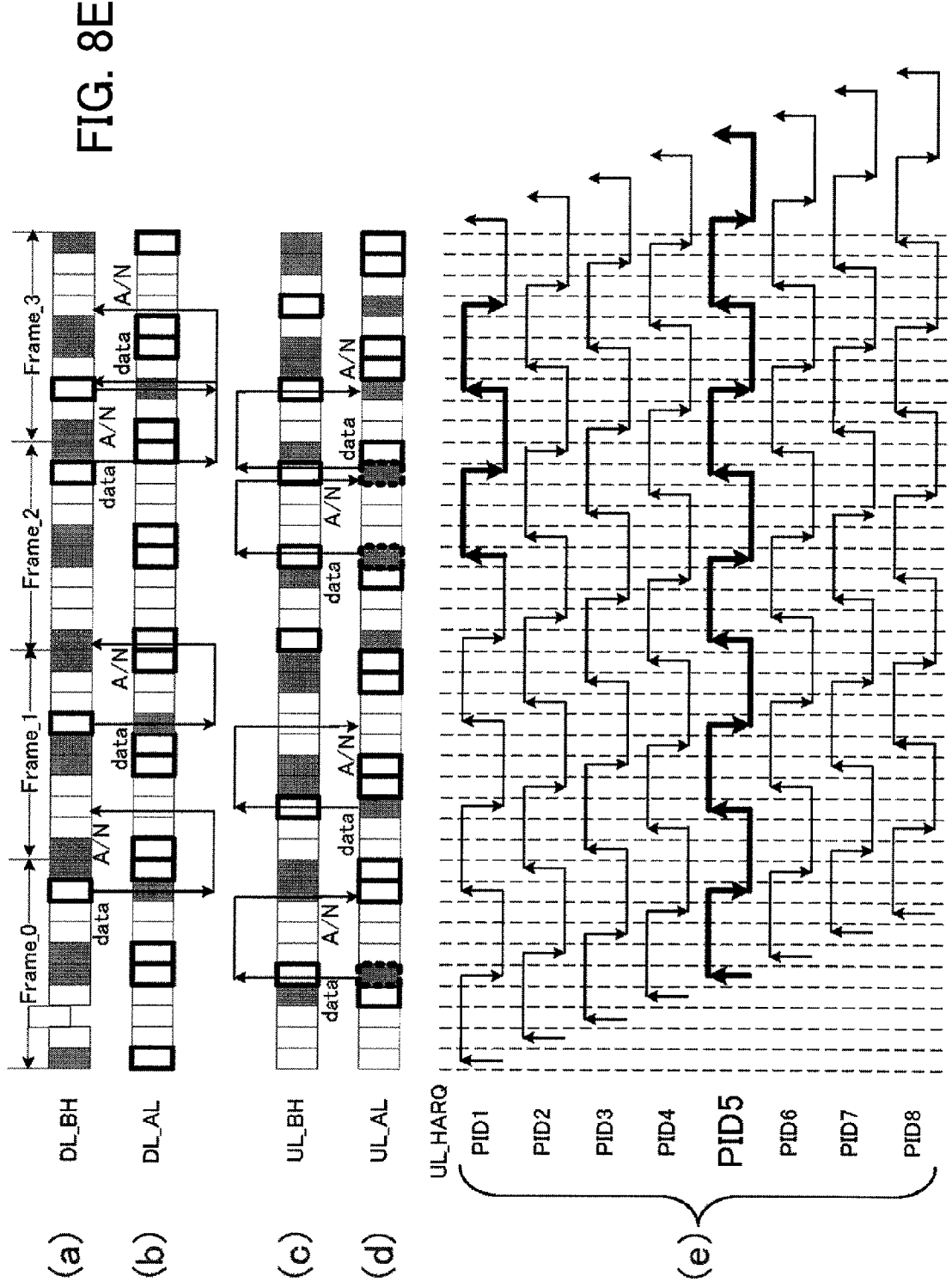

In the backhaul configuring method illustrated in FIG. 8E, as compared with that illustrated in FIG. 7E, the downlink backhaul is newly added and configured in the subframe #8 of the Frame_2. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #2 of the Frame_3 for sending back the ACK/NACK signal from the relay station RN.

As the HARQ process in which the HARQ is incapable of being performed at all the timing points, when the HARQ process of the process number PID5 is further configured, the number of the uplink backhauls is more secured. Specifically, correspondingly to the upstream access link in the HARQ process of the process number PID5, the uplink backhauls are configured in the subframe #4 of the Frame_0 and the subframe #8 of the Frame_2. In the added and configured downlink backhaul (the subframe #8 of the Frame_2), the uplink backhaul is further configured in the subframe #4 of the Frame_2 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8E, the HARQ process in which the HARQ is incapable of being performed is integrated into a part of the HARQ processes (the PID5 and the PID1 shifted by 4 ms from the PID5). Through the process, the downlink backhauls of four times and the uplink backhauls of seven times are capable of being configured for every four Frames.

Figure 8F:
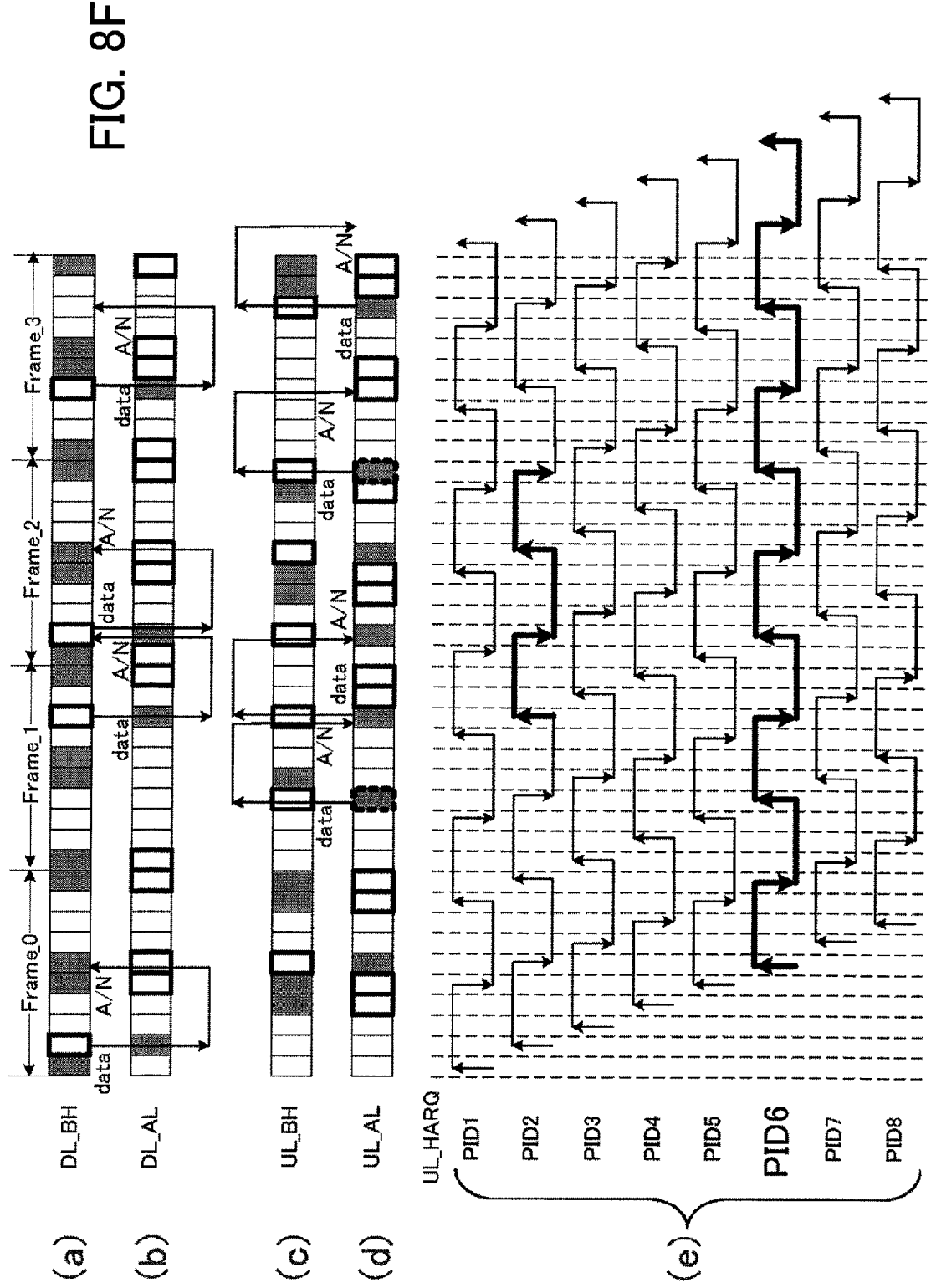

In the backhaul configuring method illustrated in FIG. 8F, as compared with that illustrated in FIG. 7F, the downlink backhaul is newly added and configured in the subframe #1 of the Frame_2. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #5 of the Frame_2 for sending back the ACK/NACK signal from the relay station RN.

As the HARQ process in which the HARQ is incapable of being performed at all the timing points, when the HARQ process of the process number PID6 is further configured, the number of the uplink backhauls is more secured. Specifically, correspondingly to the upstream access link in the HARQ process of the process number PID6, the uplink backhauls are configured in the subframe #3 of the Frame_1 and the subframe #9 of the Frame_2. In the added and configured downlink backhaul (the subframe #1 of the Frame_2), the uplink backhaul is further configured in the subframe #7 of the Frame_1 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8F, the HARQ process in which the HARQ is incapable of being performed is integrated into a part of the HARQ processes (the PID6 and the PID2 shifted by 4 ms from the PID6). Through the process, the downlink backhauls of four times and the uplink backhauls of seven times are capable of being configured for every four Frames.

In the backhaul configuring method illustrated in FIG. 8G, as compared with that illustrated in FIG. 7G, the downlink backhaul is newly added and configured in the subframe #8 of the Frame_3. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #2 of the Frame_0 for sending back the ACK/NACK signal from the relay station RN.

As the HARQ process in which the HARQ is incapable of being performed at all the timing points, when the HARQ process of the process number PID7 is further configured, the number of the uplink backhauls is more secured. Specifically, correspondingly to the upstream access link in the HARQ process of the process number PID7, the uplink backhauls are configured in the subframe #4 of the Frame_1 and the subframe #8 of the Frame_3. In the added and configured downlink backhaul (the subframe #8 of the Frame_3), the uplink backhaul is further configured in the subframe #4 of the Frame_3 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8G, the HARQ process in which the HARQ is incapable of being performed is integrated into a part of the HARQ processes (the PID7 and the PID3 shifted by 4 ms from the PID7). Through the process, the downlink backhauls of four times and the uplink backhauls of seven times are capable of being configured for every four Frames.

Figure 8H:
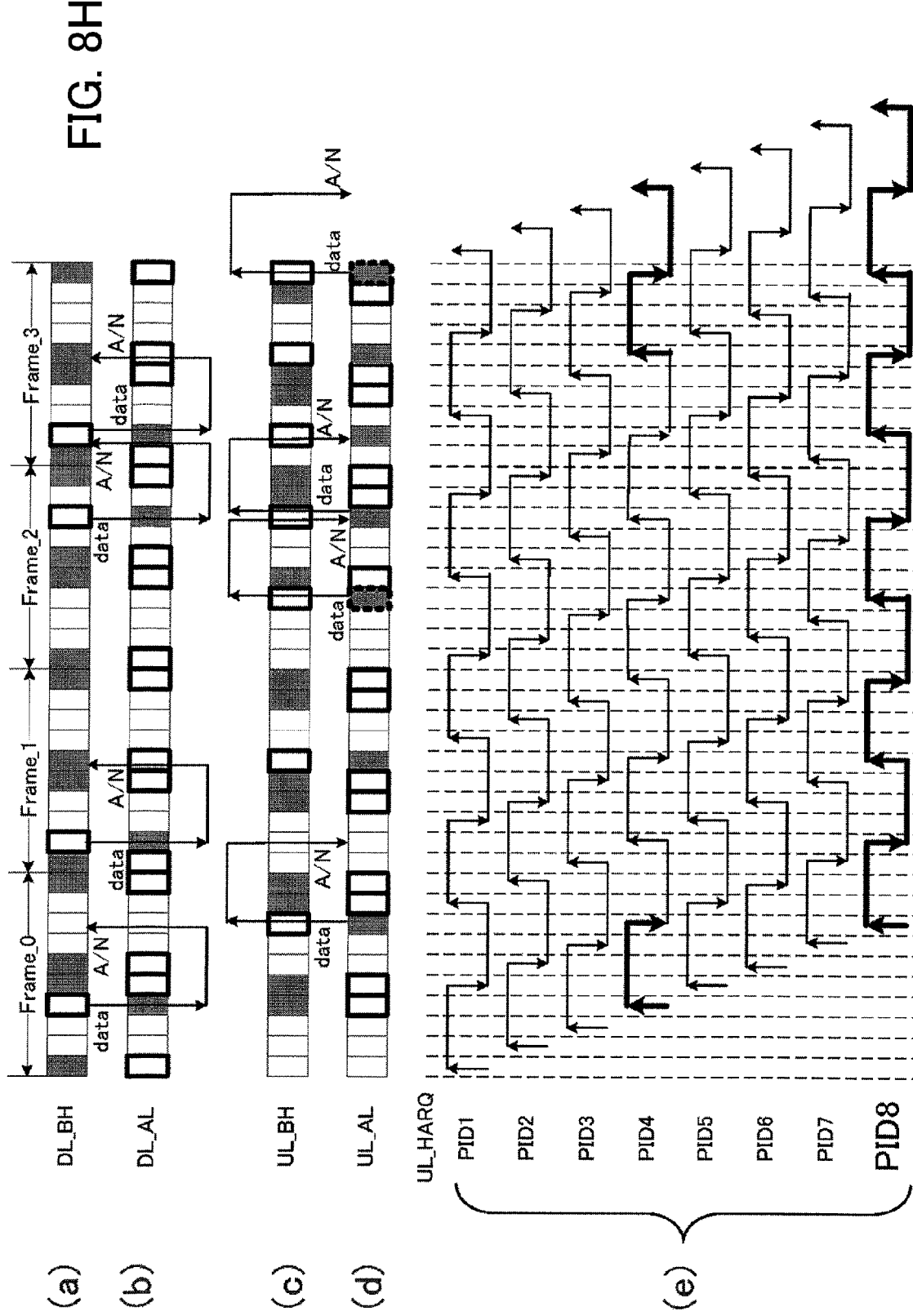

In the backhaul configuring method illustrated in FIG. 8H, as compared with that illustrated in FIG. 7H, the downlink backhaul is newly added and configured in the subframe #1 of the Frame_3. The downlink backhaul is configured in the same positions as in the above also in Frames continuous with the Frame_0 to Frame_3. As a result, after 4 ms of the data transmission from the base station eNB on this added and configured downlink backhaul, the uplink backhaul is configured in the subframe #5 of the Frame_3 for sending back the ACK/NACK signal from the relay station RN.

As the HARQ process in which the HARQ is incapable of being performed at all the timing points, when the HARQ process of the process number PID8 is further configured, the number of the uplink backhauls is more secured. Specifically, correspondingly to the upstream access link in the HARQ process of the process number PID8, the uplink backhauls are configured in the subframe #3 of the Frame_2 and the subframe #9 of the Frame_3. In the added and configured downlink backhaul (the subframe #1 of the Frame_3), the uplink backhaul is further configured in the subframe #7 of the Frame_2 before 4 ms so as to receive the ACK/NACK signal from the base station eNB. For securing the number of the uplink backhauls more as described above, the newly configured uplink backhaul having the configuration condition different from that using as a base the LTE illustrated in FIG. 6 is controlled by the relay station RN in such a manner that transmission is not performed through the upstream access link.

As a result of configuring the downlink backhaul and the uplink backhaul as described above, as illustrated in (e) of FIG. 8H, the HARQ process in which the HARQ is incapable of being performed is integrated into a part of the HARQ processes (the PID8 and the PID4 shifted by 4 ms from the PID8). Through the process, the downlink backhauls of four times and the uplink backhauls of seven times are capable of being configured for every four Frames.

FIGS. 9A and 9B tabulate the backhauls configured by the backhaul configuring method exemplified in FIGS. 8A to 8H. In FIGS. 9A and 9B, in the case where values of Configuration are 0 to 7, they correspond to transmission and reception timing points set in FIGS. 8A to 8H, respectively. An SFN (System Frame Number) means a Frame number, and Frames of the SFN in which SFN mod 4=0, 1, 2, and 3 hold correspond to the Frames 0, 1, 2, and 3 in FIGS. 8A to 8H, respectively.

For each value of the Configuration, FIG. 9A illustrates a subframe #i (i=0, . . . , 9) through which the relay station RN receives the ACK/NACK signal, namely, the downlink backhaul #i. In the subframe #(i−4) before 4 ms of the here described subframe #i, the uplink backhaul is configured.

FIG. 9B illustrates a subframe #i (i=0, . . . , 9) through which the relay station RN transmits the ACK/NACK signal, namely, an uplink backhaul #i. That is, in the subframe #(i−4) before 4 ms of the here described subframe #i, the downlink backhaul is configured. The uplink backhaul not described in FIG. 9B is appropriately determined according to a value of each configuration, namely, the timing of the uplink transmission of the HARQ process to be integrated.

As can be seen from the above description, in the backhaul configuring method according to the present embodiment, a plurality of HARQ processes are integrated into the HARQ process in which the HARQ is incapable of being performed for more securing the configuration frequency of the downlink and uplink backhauls. Through the process, the configuration frequency of the backhaul is more increased and the scheduling on the access link of the relay station RN is easily performed to maintain the efficiency of the access link. As a result, both of the above matters are compatible with a high level.

Referring again to FIG. 8A, for example, the downlink backhaul is not configured after 4 ms of the uplink backhaul configured in the subframe #2 of the Frame_1. Therefore, it is not preferred that on the uplink backhaul configured in the subframe #2 of the Frame_1, the relay station RN transmits data (user data) necessary for a reply of the ACK/NACK signal to the base station eNB. The reason is that the downlink backhaul is not configured after 4 ms of the uplink backhaul configured in the subframe #2 of the Frame_1. Accordingly, through the uplink backhaul in which the downlink backhaul is not configured after 4 ms among the uplink backhauls configured by using the backhaul configuring method illustrated in FIGS. 8A to 8H, the relay station RN transmits data unnecessary for a reply of the ACK/NACK signal from the base station eNB. Examples of the data unnecessary for a reply of the ACK/NACK signal include data for a CQI (Channel Quality Indicator) report.

Although there is limited a data type to be transmitted through a part of the configured uplink backhaul, data to be transmitted through each uplink backhaul is appropriately managed, thereby securing the configuration frequency of the uplink backhaul more.

(3) Third Embodiment

A backhaul configuring method according to a third embodiment will be described below.

In the second embodiment, there is illustrated an example in which a backhaul is added to the backhauls configured according to the first embodiment and the downlink backhaul is secured in each Frame. However, the downlink backhaul is arbitrarily configured in each frame. Assume specifically that with regard to the reply timing of the HARQ, the ACK/NACK signal is sent back after 4 ms of the data transmission. At the same time, the backhaul is preferably configured in such a manner that the number of the HARQ processes in which the HARQ is incapable of being performed partly or wholly is reduced as much as possible. An example in which the proposed backhaul configuring method is different from that according to the second embodiment will be described below.

The backhaul configuring method according to the present embodiment will be specifically described below with reference to FIGS. 10A to 10H. Formats of FIGS. 10A to 10H are the same as that of FIG. 6. FIGS. 10A to 10H each illustrate a case where the HARQ process in which the HARQ is incapable of being partly performed stands in the HARQ processes of the process numbers PID1 to PID8 and the HARQ processes of the process numbers PID5 to PID8 shifted after 4 ms of the above HARQ processes. FIGS. 10A to 10H further illustrate by using thick lines the timing points at which the HARQ is incapable of being performed.

The backhaul configuring method illustrated in FIGS. 10A to 10H differs from that illustrated in FIGS. 8A to 8H in that two HARQ processes in which the HARQ is incapable of being partly performed are configured.

Figure 10A:
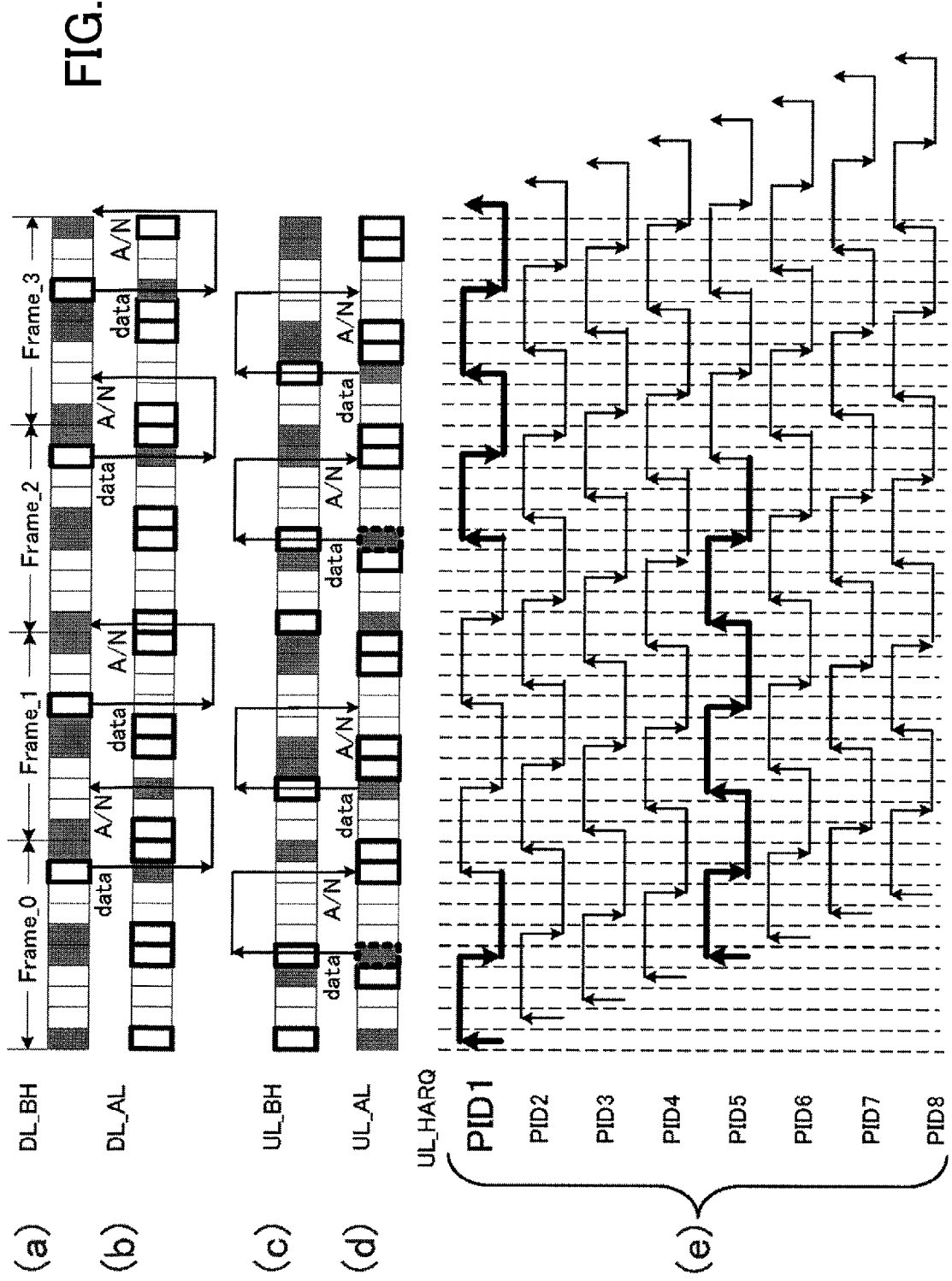

In FIG. 10A, the downlink backhauls are secured in each of the four continuing frames. Specifically, in FIG. 10A, in the subframe #8 of the Frame_0, the subframe #6 of the Frame_1, the subframe #8 of the Frame_2, and the subframe #6 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #2 of the Frame_1, the subframe #0 of the Frame_2, the subframe #2 of the Frame_3, and the subframe #0 of the Frame_0.

Here, as a HARQ process in which the HARQ is incapable of being partly performed, there are configured the HARQ process of the process number PID1 and the HARQ process of the process number PID5 shifted after 4 ms from the HARQ process of the process number PID1. Through the process, the number of the uplink backhauls is more secured. Specifically, the uplink backhauls are configured in the subframe #4 of the Frame_2 corresponding to the upstream access link in the HARQ process of the process number PID1, and the subframe #4 of the Frame_0 corresponding to the upstream access link in the HARQ process of the process number PID5. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10A, the HARQ processes in which the HARQ is incapable of being partly performed are integrated into a part of the HARQ processes (PID1 and the PID5 shifted by 4 ms from the PID1). Through the process, the downlink backhauls of four times and the uplink backhauls of six times are capable of being configured for every four Frames.

Figure 10B:
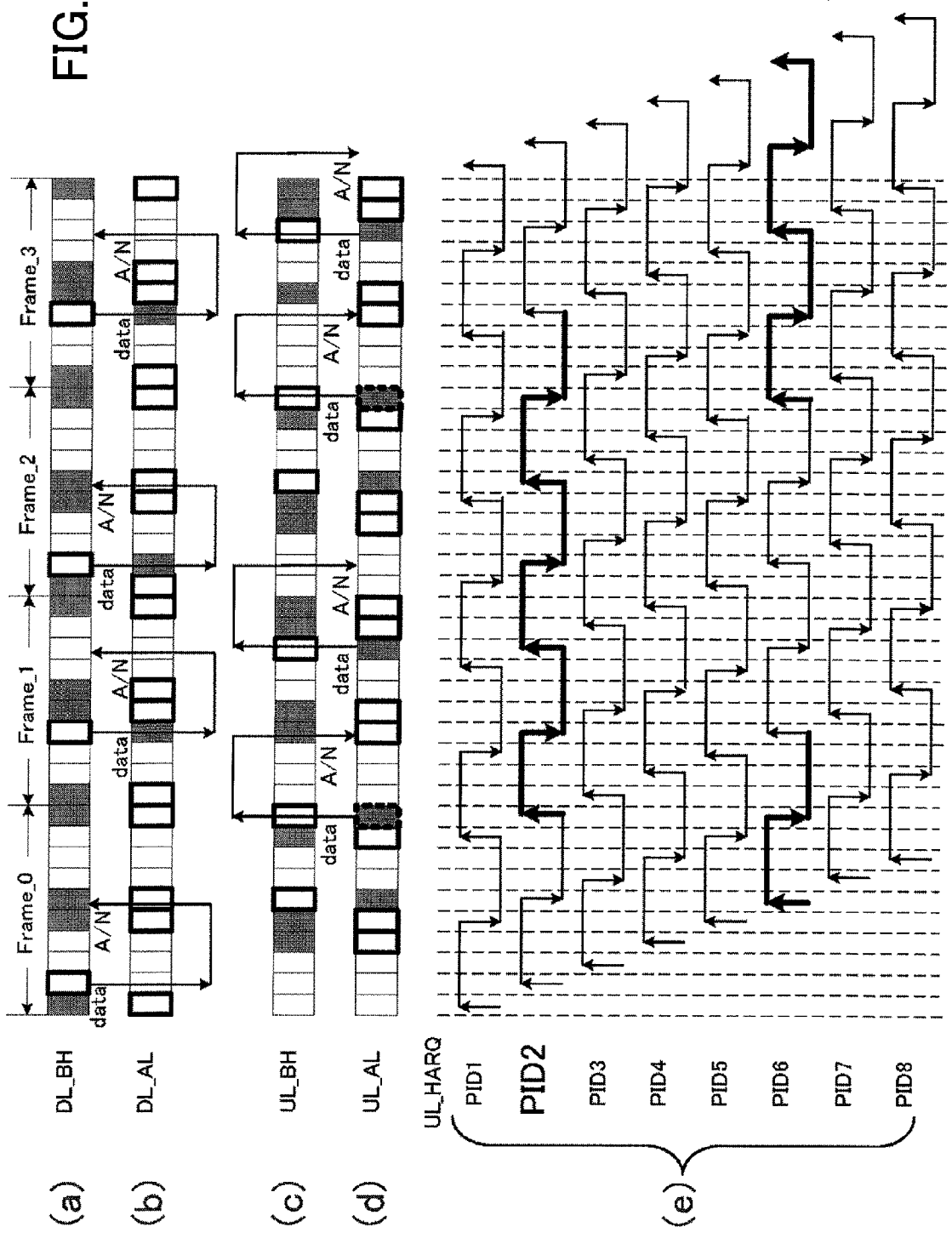

In FIG. 10B, the downlink backhauls are secured in each of the four continuing frames. Specifically, in FIG. 10B, in the subframe #1 of the Frame_0, the subframe #3 of the Frame_1, the subframe #1 of the Frame_2, and the subframe #3 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #5 of the Frame_0, the subframe #7 of the Frame_1, the subframe #5 of the Frame_2, and the subframe #7 of the Frame_3.

Here, as a HARQ process in which the HARQ is incapable of being partly performed, there are configured the HARQ process of the process number PID2 and the HARQ process of the process number PID6 shifted after 4 ms from the HARQ process of the process number PID2. Through the process, the number of the uplink backhauls is more secured. Specifically, the uplink backhauls are configured in the subframe #9 of the Frame_0 corresponding to the upstream access link in the HARQ process of the process number PID2, and the subframe #9 of the Frame_2 corresponding to the upstream access link in the HARQ process of the process number PID6. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10B, the HARQ processes in which the HARQ is incapable of being partly performed are integrated into a part of the HARQ processes (PID2 and the PID6 shifted by 4 ms from the PID2). Through the process, the downlink backhauls of four times and the uplink backhauls of six times are capable of being configured for every four Frames.

Figure 10C:
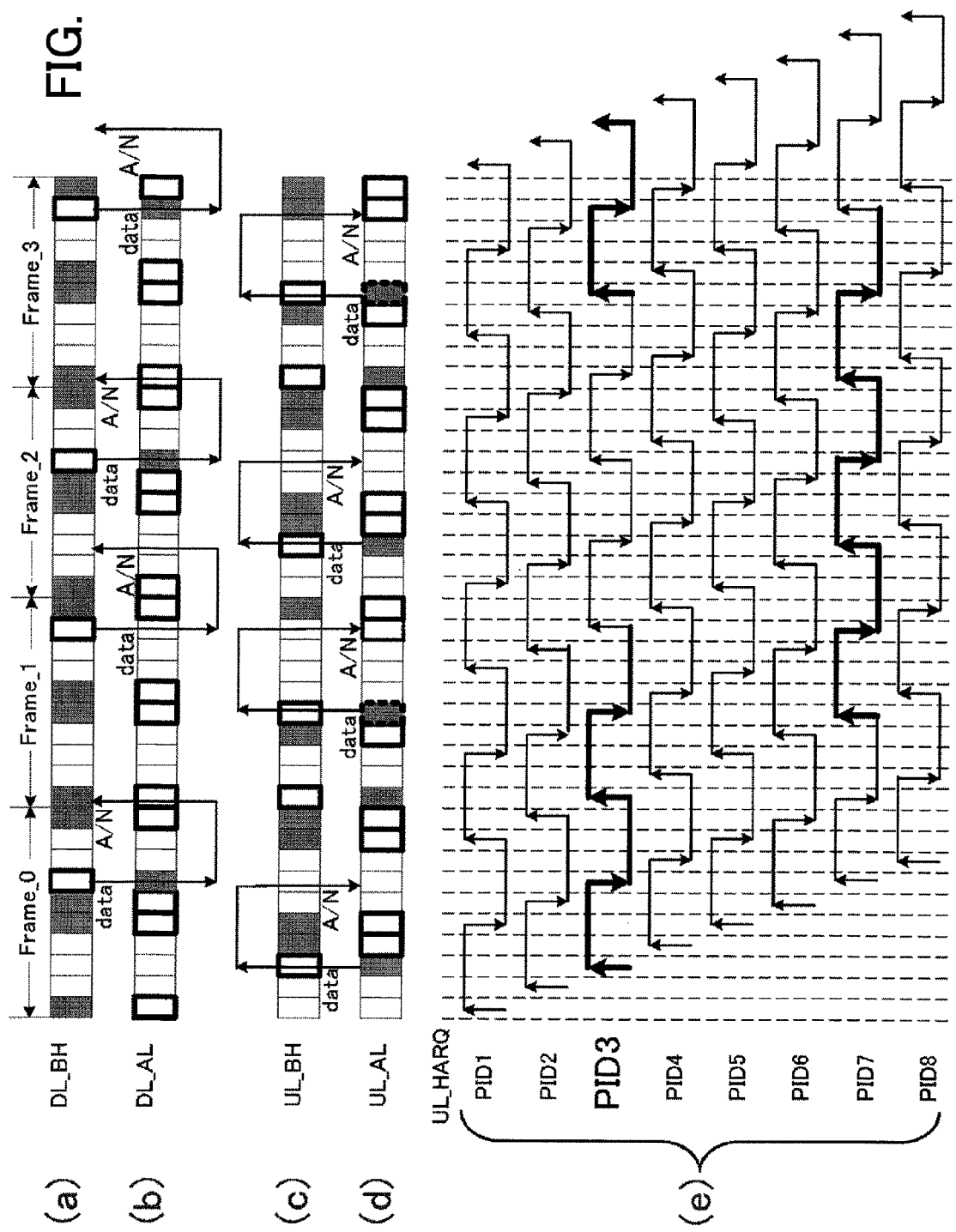

In FIG. 10C, the downlink backhauls are secured in each of the four continuing frames. Specifically, in FIG. 10C, in the subframe #6 of the Frame_0, the subframe #8 of the Frame_1, the subframe #6 of the Frame_2, and the subframe #8 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #0 of the Frame_1, the subframe #2 of the Frame_2, the subframe #0 of the Frame_3, and the subframe #2 of the Frame_0.

Here, as a HARQ process in which the HARQ is incapable of being partly performed, there are configured the HARQ process of the process number PID3 and the HARQ process of the process number PID7 shifted after 4 ms from the HARQ process of the process number PID3. Through the process, the number of the uplink backhauls is more secured. Specifically, the uplink backhauls are configured in the subframe #4 of the Frame_3 corresponding to the upstream access link in the HARQ process of the process number PID3, and the subframe #4 of the Frame_1 corresponding to the upstream access link in the HARQ process of the process number PID7. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10C, the HARQ processes in which the HARQ is incapable of being partly performed are integrated into a part of the HARQ processes (PID3 and the PID7 shifted by 4 ms from the PID3). Through the process, the downlink backhauls of four times and the uplink backhauls of six times are capable of being configured for every four Frames.

In FIG. 10D, the downlink backhauls are secured in each of the four continuing frames. Specifically, in FIG. 10D, in the subframe #3 of the Frame_0, the subframe #1 of the Frame_1, the subframe #3 of the Frame_2, and the subframe #1 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #7 of the Frame_0, the subframe #5 of the Frame_1, the subframe #7 of the Frame_2, and the subframe #5 of the Frame_3.

Here, as a HARQ process in which the HARQ is incapable of being partly performed, there are configured the HARQ process of the process number PID4 and the HARQ process of the process number PID8 shifted after 4 ms from the HARQ process of the process number PID4. Through the process, the number of the uplink backhauls is more secured. Specifically, the uplink backhauls are configured in the subframe #9 of the Frame_1 corresponding to the upstream access link in the HARQ process of the process number PID4, and the subframe #9 of the Frame_3 corresponding to the upstream access link in the HARQ process of the process number PID8. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10D, the HARQ processes in which the HARQ is incapable of being partly performed are integrated into a part of the HARQ processes (PID4 and the PID8 shifted by 4 ms from the PID4). Through the process, the downlink backhauls of four times and the uplink backhauls of six times are capable of being configured for every four Frames.

Figure 10E:
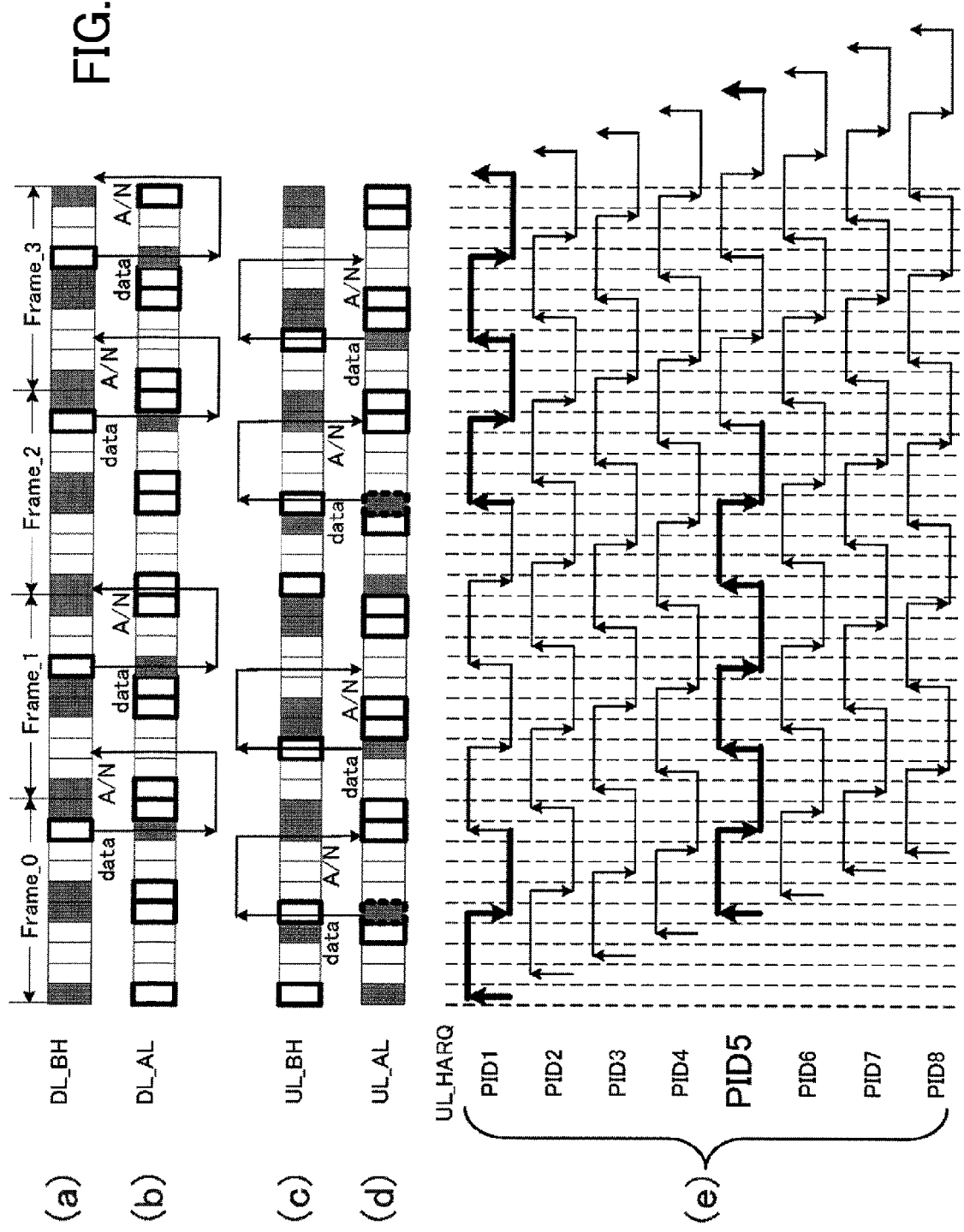

In FIG. 10E, the downlink backhauls are secured in each of the four continuing frames. Specifically, in FIG. 10E, in the subframe #8 of the Frame_0, the subframe #6 of the Frame_1, the subframe #8 of the Frame_2, and the subframe #6 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #2 of the Frame_1, the subframe #0 of the Frame_2, the subframe #2 of the Frame_3, and the subframe #0 of the Frame_0.

Here, as a HARQ process in which the HARQ is incapable of being partly performed, there are configured the HARQ process of the process number PID5 and the HARQ process of the process number PID1 shifted after 4 ms from the HARQ process of the process number PID5. Through the process, the number of the uplink backhauls is more secured. Specifically, the uplink backhauls are configured in the subframe #4 of the Frame_0 corresponding to the upstream access link in the HARQ process of the process number PID5, and the subframe #4 of the Frame_2 corresponding to the upstream access link in the HARQ process of the process number PID1. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10E, the HARQ processes in which the HARQ is incapable of being partly performed are integrated into a part of the HARQ processes (PID5 and the PID1 shifted by 4 ms from the PID5). Through the process, the downlink backhauls of four times and the uplink backhauls of six times are capable of being configured for every four Frames.

Figure 10F:
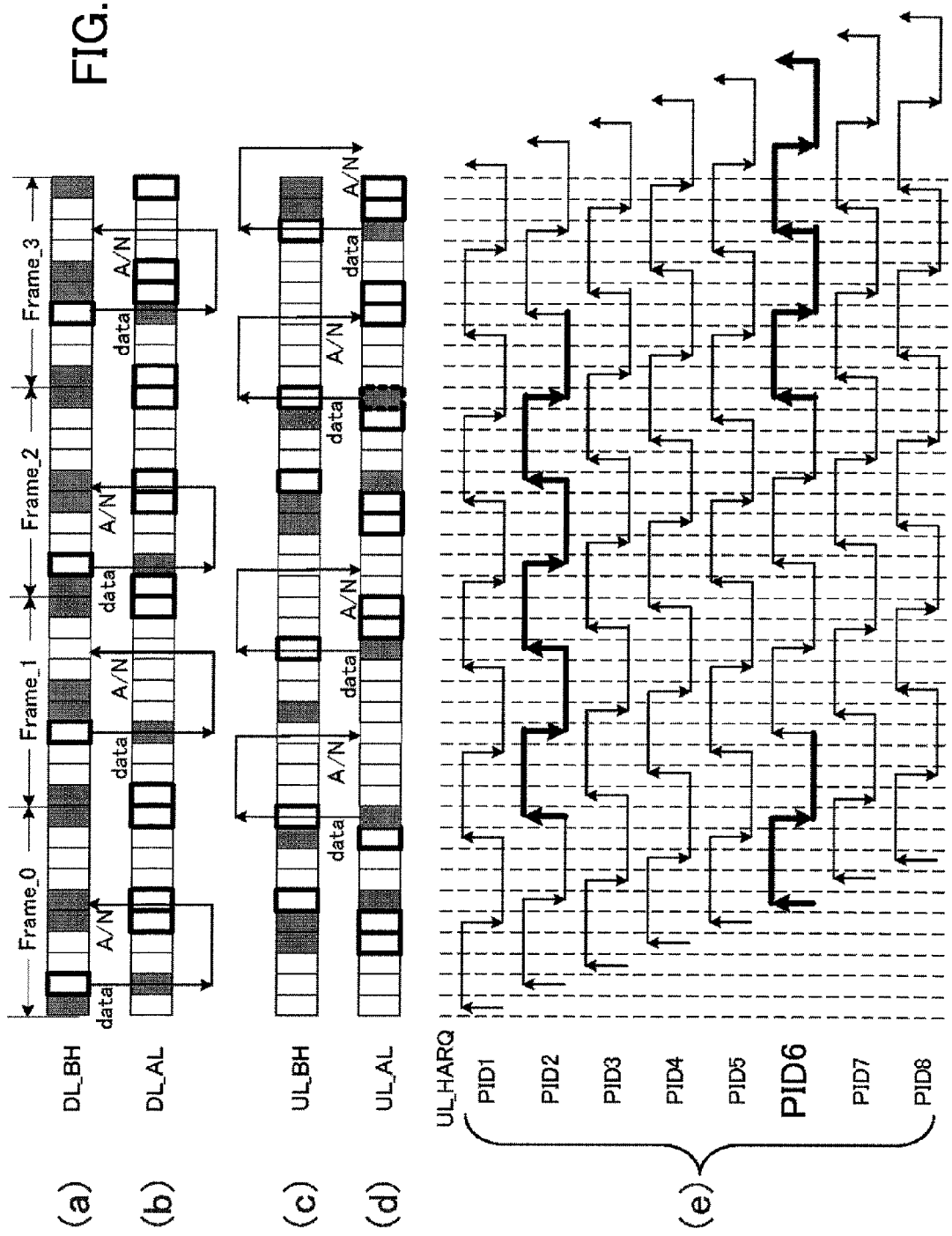

In FIG. 10F, the downlink backhauls are secured in each of the four continuing frames. Specifically, in FIG. 10F, in the subframe #1 of the Frame_0, the subframe #3 of the Frame_1, the subframe #1 of the Frame_2, and the subframe #3 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #5 of the Frame_0, the subframe #7 of the Frame_1, the subframe #5 of the Frame_2, and the subframe #7 of the Frame_3.

Here, as a HARQ process in which the HARQ is incapable of being partly performed, there are configured the HARQ process of the process number PID6 and the HARQ process of the process number PID2 shifted after 4 ms from the HARQ process of the process number PID6. Through the process, the number of the uplink backhauls is more secured. Specifically, the uplink backhauls are configured in the subframe #9 of the Frame_2 corresponding to the upstream access link in the HARQ process of the process number PID6, and the subframe #9 of the Frame_0 corresponding to the upstream access link in the HARQ process of the process number PID2. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10F, the HARQ processes in which the HARQ is incapable of being partly performed are integrated into a part of the HARQ processes (PID6 and the PID2 shifted by 4 ms from the PID6). Through the process, the downlink backhauls of four times and the uplink backhauls of six times are capable of being configured for every four Frames.

In FIG. 10G, the downlink backhauls are secured in each of the four continuing frames. Specifically, in FIG. 10G, in the subframe #6 of the Frame_0, the subframe #8 of the Frame_1, the subframe #6 of the Frame_2, and the subframe #8 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #0 of the Frame_1, the subframe #2 of the Frame_2, the subframe #0 of the Frame_3, and the subframe #2 of the Frame_0.

Here, as a HARQ process in which the HARQ is incapable of being partly performed, there are configured the HARQ process of the process number PID7 and the HARQ process of the process number PID3 shifted after 4 ms from the HARQ process of the process number PID7. Through the process, the number of the uplink backhauls is more secured. Specifically, the uplink backhauls are configured in the subframe #4 of the Frame_1 corresponding to the upstream access link in the HARQ process of the process number PID7, and the subframe #4 of the Frame_3 corresponding to the upstream access link in the HARQ process of the process number PID3. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10G, the HARQ processes in which the HARQ is incapable of being partly performed are integrated into a part of the HARQ processes (PID7 and the PID3 shifted by 4 ms from the PID7). Through the process, the downlink backhauls of four times and the uplink backhauls of six times are capable of being configured for every four Frames.

Figure 10H:
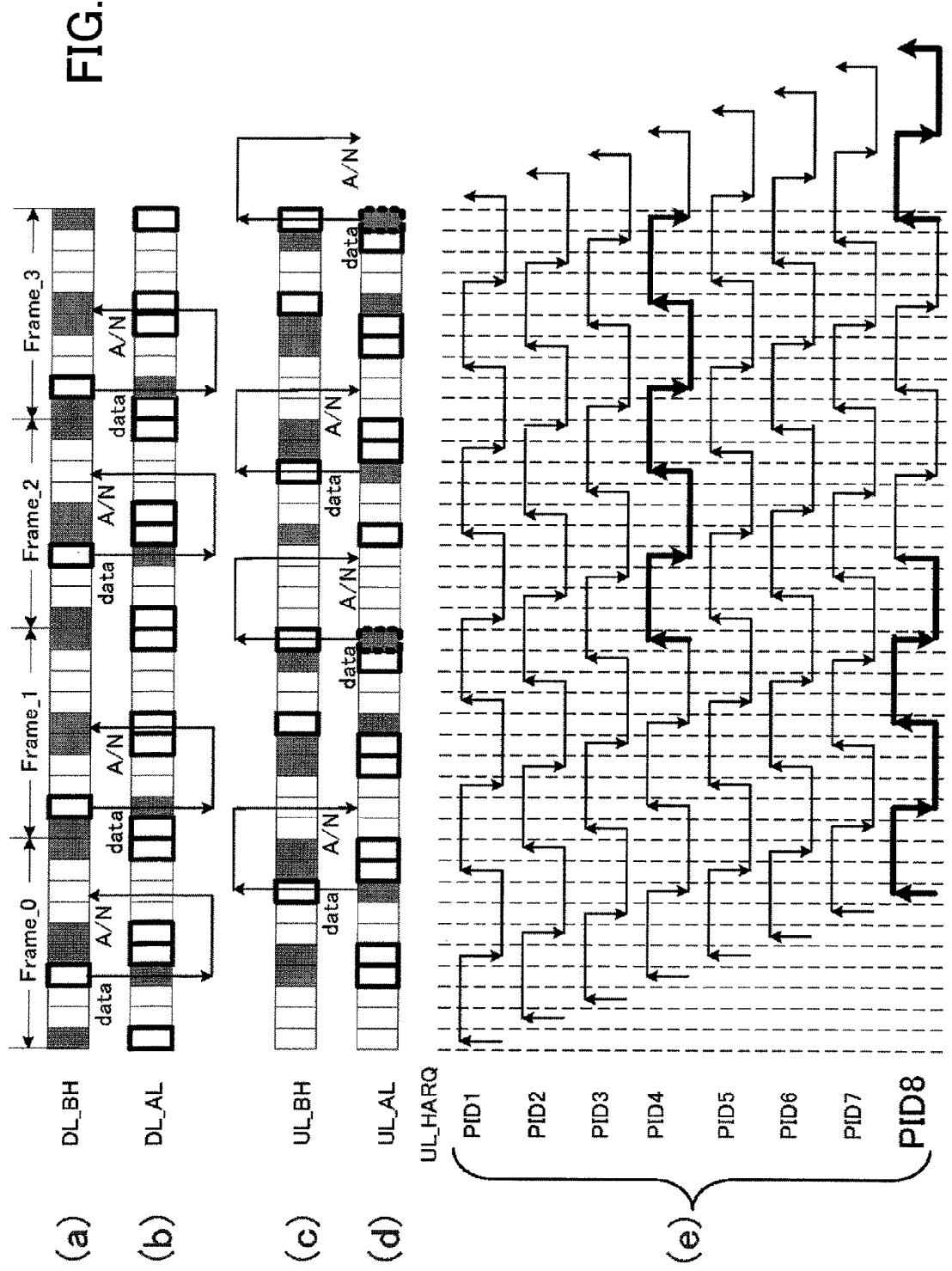

In FIG. 10H, the downlink backhauls are secured in each of the four continuing frames. Specifically, in FIG. 10H, in the subframe #3 of the Frame_0, the subframe #1 of the Frame_1, the subframe #3 of the Frame_2, and the subframe #1 of the Frame_3, the downlink backhauls are configured. Also, with relation to Frames continuous with the Frame_0 to Frame_3, the downlink backhauls are configured in the same position as in the above. After 4 ms of the data transmission from the base station eNB through the thus configured downlink backhauls, for sending back the ACK/NACK signal from the relay station RN, the uplink backhauls are configured in the subframe #7 of the Frame_0, the subframe #5 of the Frame_1, the subframe #7 of the Frame_2, and the subframe #5 of the Frame_3.

Here, as a HARQ process in which the HARQ is incapable of being partly performed, there are configured the HARQ process of the process number PID8 and the HARQ process of the process number PID4 shifted after 4 ms from the HARQ process of the process number PID8. Through the process, the number of the uplink backhauls is more secured. Specifically, the uplink backhauls are configured in the subframe #9 of the Frame_3 corresponding to the upstream access link in the HARQ process of the process number PID8, and the subframe #9 of the Frame_1 corresponding to the upstream access link in the HARQ process of the process number PID4. A part of the configured uplink backhauls having the configuration condition different from that using as a base the LTE illustrated in FIG. 6 are controlled by the relay station RN in such a manner that transmission is not performed through the upstream access link.

As a result of configuring the downlink backhauls and the uplink backhauls as described above, as illustrated in (e) of FIG. 10H, the HARQ processes in which the HARQ is incapable of being partly performed are integrated into a part of the HARQ processes (PID8 and the PID4 shifted by 4 ms from the PID8). Through the process, the downlink backhauls of four times and the uplink backhauls of six times are capable of being configured for every four Frames.

FIGS. 11A and 11B tabulate the backhauls configured by the backhaul configuring method exemplified in FIGS. 10A to 10H. In FIGS. 11A and 11B, in the case where values of the Configurations are from 0 to 7, they correspond to transmission and reception timing points set in FIGS. 10A to 10H, respectively. Frames of the SFNs in which the SFN mod 4=0, 1, 2, and 3 hold correspond to the Frames_0, 1, 2, and 3 in FIGS. 10A to 10H, respectively.

For each value of the Configurations, FIG. 11A illustrates a subframe #i (i=0, . . . , 9) through which the relay station RN receives the ACK/NACK signal, namely, the downlink backhaul #i. In the subframe #(i−4) before 4 ms of the here described subframe #i, the uplink backhaul is configured.

FIG. 11B illustrates a subframe #i (i=0, . . . , 9) through which the relay station RN transmits the ACK/NACK signal, namely, the uplink backhaul #i. In other words, the downlink backhaul is configured in the subframe #(i−4) before 4 ms of the here described subframe #i. The uplink backhauls not described in FIG. 11B are appropriately determined according to each value of the Configurations, namely, the timing of the uplink transmission of the HARQ process to be integrated.

As described above, in the backhaul configuring method according to the present embodiment, for securing the configuration frequency of the downlink and uplink backhauls as much as possible, a plurality of HARQ processes are integrated into the HARQ process in which the HARQ is incapable of being performed. Through the process, in the same manner as in the second embodiment, the configuration frequency of the backhaul is more increased and the scheduling on the access link of the relay station RN is easily performed to maintain the efficiency of the access link. As a result, both of the above matters are compatible with a high level.

(4) Fourth Embodiment

A backhaul configuring method according to a fourth embodiment will be described below.

In the first to third embodiments, the backhaul configuring method is described assuming that the backward compatibility with the LTE is maintained with regard to reply timing of the HARQ. Specifically, in the first to third embodiments, the ACK/NACK signal is assumed to be sent back after 4 ms of the data transmission. However, when the backward compatibility with the LTE is not assumed, the efficiency of the access link may be improved by a method different from those described in the first to third embodiments.

Figure 1:
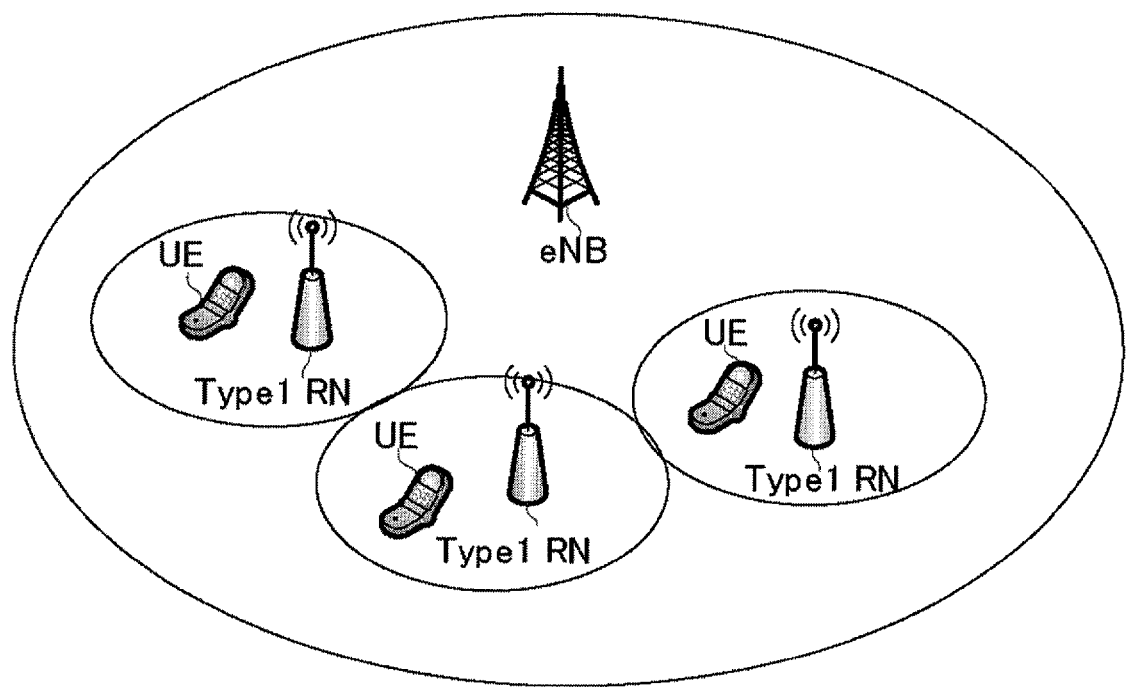
FIG. 1 is a configuration diagram illustrating a mobile communication system including a relay station RN which supports communication between a base station eNB and a mobile station UE.
Figure 2:
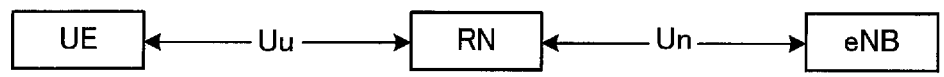
FIG. 2 illustrates a link configuration among a base station eNB, a relay station RN, and a mobile station UE.
Figure 4:
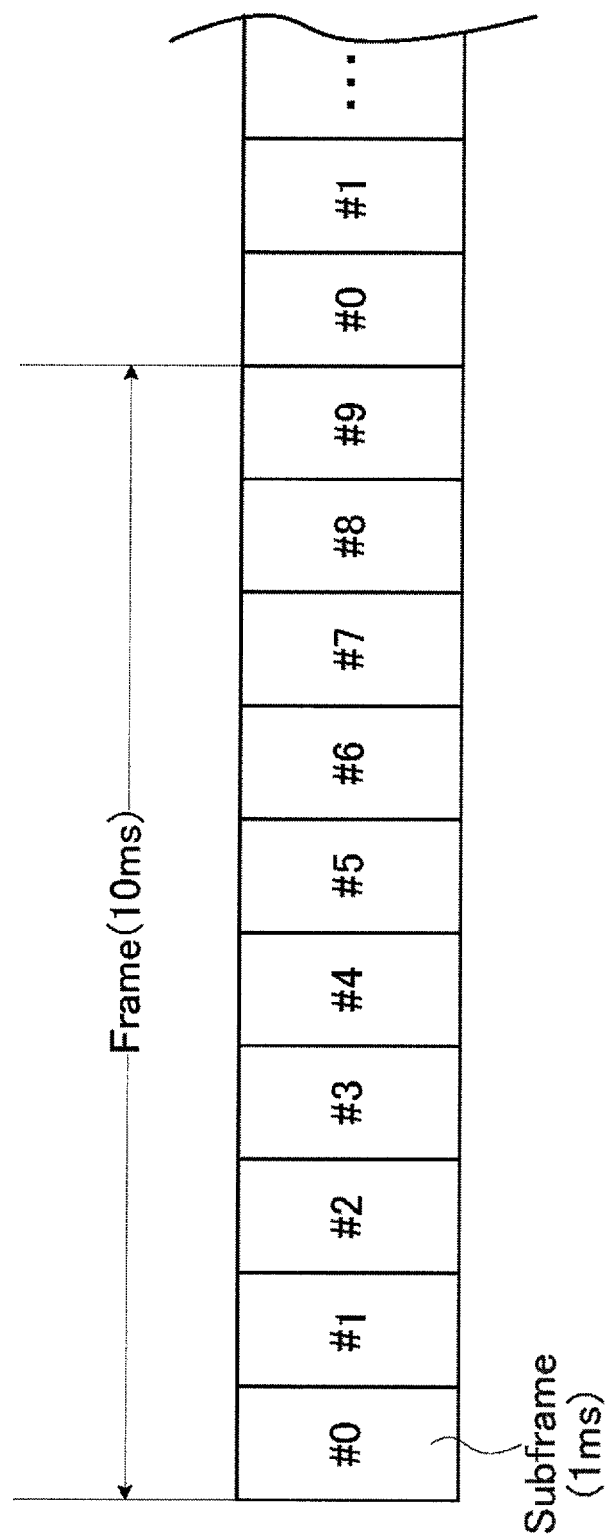
FIG. 4 illustrates a configuration of one Frame.
Figure 5:
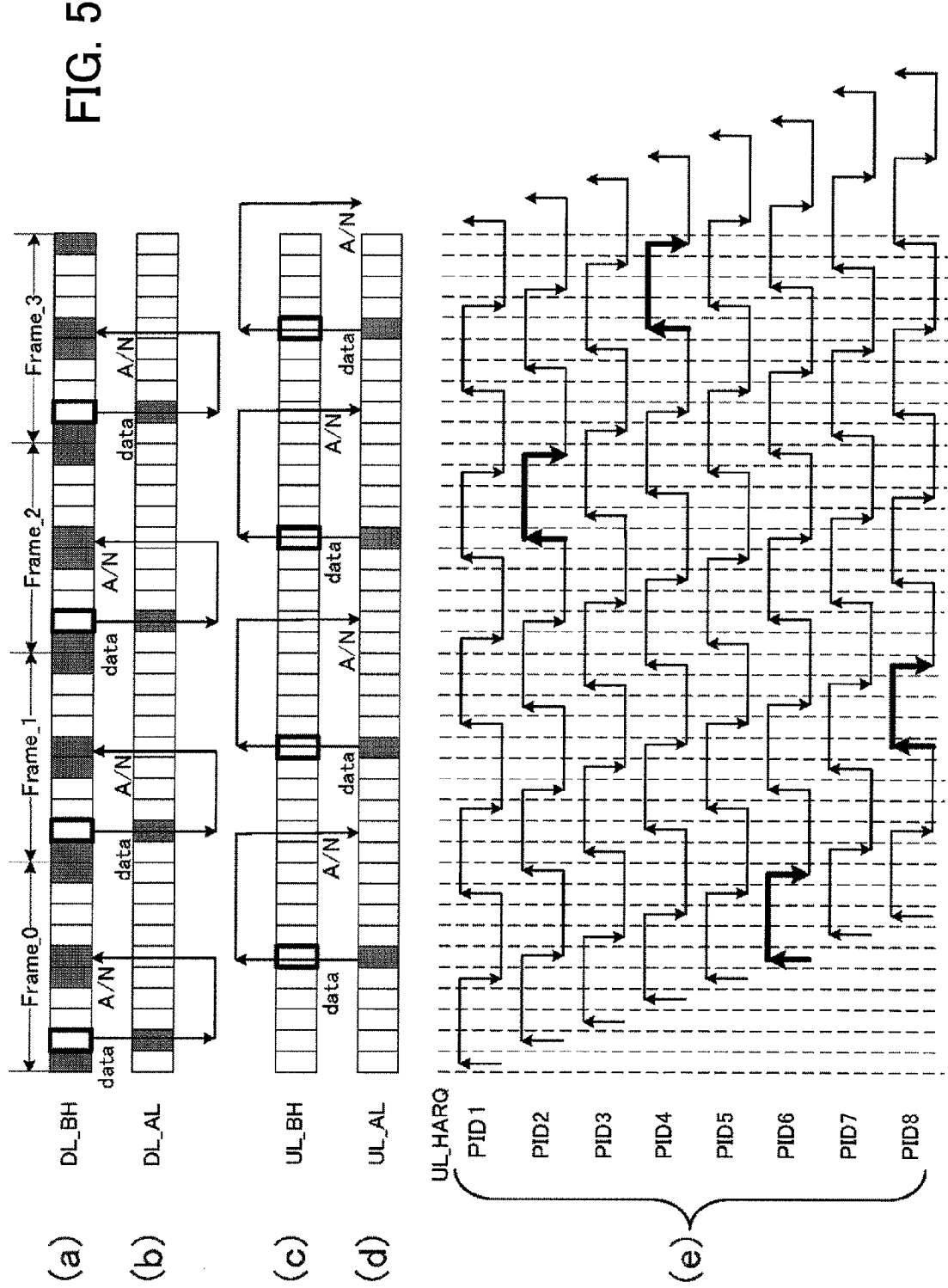
FIG. 5 illustrates a problem in the case of configuring a backhaul in a position of the same subframe in a radio Frame at all times.

Assume that, in the present embodiment, since the specifications are different from those of the LTE, the ACK/NACK signal is sent back after 4 ms of the downlink data transmission, and the ACK/NACK signal is sent back after 6 ms of the uplink data transmission. According to this assumption, as exemplified in FIG. 5, a position of the downlink backhaul and that of the uplink backhaul are always made constant in each Frame. In FIG. 5, an example in which the downlink backhaul is configured in the subframe #1 is illustrated; however, it is not limited thereto. As far as the uplink backhaul is configured after 4 ms of the downlink backhaul, the downlink backhaul may be configured in an arbitrary position of one Frame.

As illustrated in FIG. 5, in the case where the downlink backhaul is configured in the subframe #1, it is as described previously that the HARQ is incapable of being performed due to the timing of a part of the respective HARQ processes of the process numbers PID2, PID4, PID6, and PID8. In the present embodiment, a duration in which this HARQ is incapable of being performed is configured in the Measurement gap specified by the LTE.

As described in 3GPP TS 36. 133 V9. 2. 0 (2009-12), 3rd Generation Partnership Project; Technical Specification Group Radio Access Network; Evolved Universal Terrestrial Radio Access (E-UTRA); Requirements for support of radio resource management (Release 9), the Measurement gap is composed of a duration of 6 ms in the downlink transmission direction and a duration of 7 ms in the uplink transmission direction provided for a handover of the mobile station UE. As an interval of the Measurement gap, for example, 40 ms is specified. In this Measurement gap, the mobile station UE switches a reception frequency, and performs radio quality measurement of a frequency band different from that of the relay station RN with which the mobile station UE communicates at present. That is, since the uplink transmission is performed from the mobile station UE to the relay station RN in the Measurement gap, there is no trouble even if the HARQ is incapable of being performed in the Measurement gap.

Figure 12:
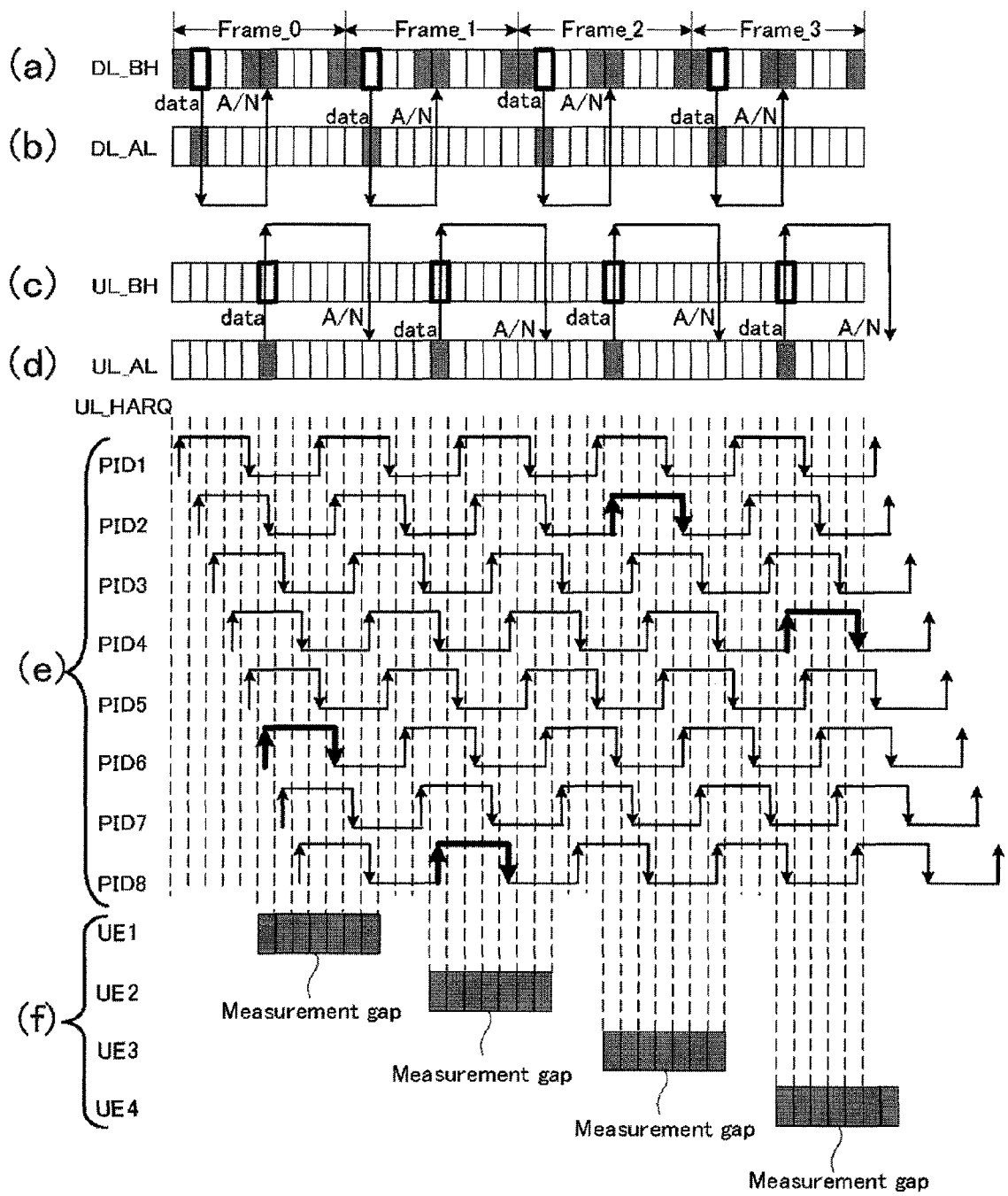
FIG. 12 illustrates one example of durations of a Measurement gap configured in a fourth embodiment.

FIG. 12 illustrates durations of the Measurement gap at the time when the backhaul is configured at the timing illustrated in FIG. 5. FIG. 12 differs from FIG. 5 in that duration of the Measurement gap is added. As an example, (f) of FIG. 12 illustrates durations of the Measurement gaps of the mobile stations UE1 to UE4.

Each mobile station UE connected to the relay station RN is allocated to any of the HARQ processes of the process numbers PID1 to PID8. In the present embodiment, with respect to the mobile station UE allocated to the HARQ process including the duration in which the HARQ is incapable of being performed, the duration in which the HARQ is incapable of being performed is configured in the duration of the Measurement gap. Suppose, for example, that in an example illustrated in FIG. 12, the mobile station UE1 is allocated to the process number PID6. At this time, the duration of the Measurement gap including the duration of the subframes #5 to #9 of the Frame_0 is configured to the mobile station UE1. In the example illustrated in FIG. 12, the mobile stations UE2, UE3, and UE4 are allocated to the process numbers PID8, PID2, and PID4, respectively, and the duration of the Measurement gap is configured in the same manner.

In the backhaul configuring method according to the present embodiment, the configuration itself of the backhaul is performed by the same method as those of the foregoing first to third embodiments. In the present embodiment, the duration of the Measurement gap including the duration in which the HARQ is incapable of being performed is further configured to the mobile station UE. That is, since the Measurement gap is configured in the duration in which the access link is incapable of being used, while the configuration frequency of the backhaul is more secured, each mobile station UE maintains the efficiency of the access link.

The configuration of the backhaul illustrated in FIG. 12 is simply one example for describing the present embodiment. The duration of the Measurement gap including the duration in which the HARQ is incapable of being performed is preferably configured to the mobile station UE allocated to the HARQ process including the HARQ incapable of being performed, irrespective of a position in one Frame of the backhaul. Accordingly, configuration of the duration of the Measurement gap according to the present embodiment is apparently applicable to the foregoing first to third embodiments. Namely, the above configuration is applicable also to a case where reply timing of the ACK/NACK signal of the LTE is maintained. In the backhaul configuring method illustrated in FIG. 8A, for example, the duration of the Measurement gap including the duration (the duration in which the HARQ is incapable of being performed) from the subframe #4 of the Frame_0 to the subframe #6 of the Frame_1 is configured to the mobile station UE allocated to the process number PID5.

(5) Fifth Embodiment

A relay station RN and mobile station UE according to a fifth embodiment will be described below.

In the present embodiment, configurations and operations of the relay station RN and mobile station UE for performing processes of the foregoing first to fourth embodiments will be described.

(5-1) Configuration of Relay Station RN

Figure 13:
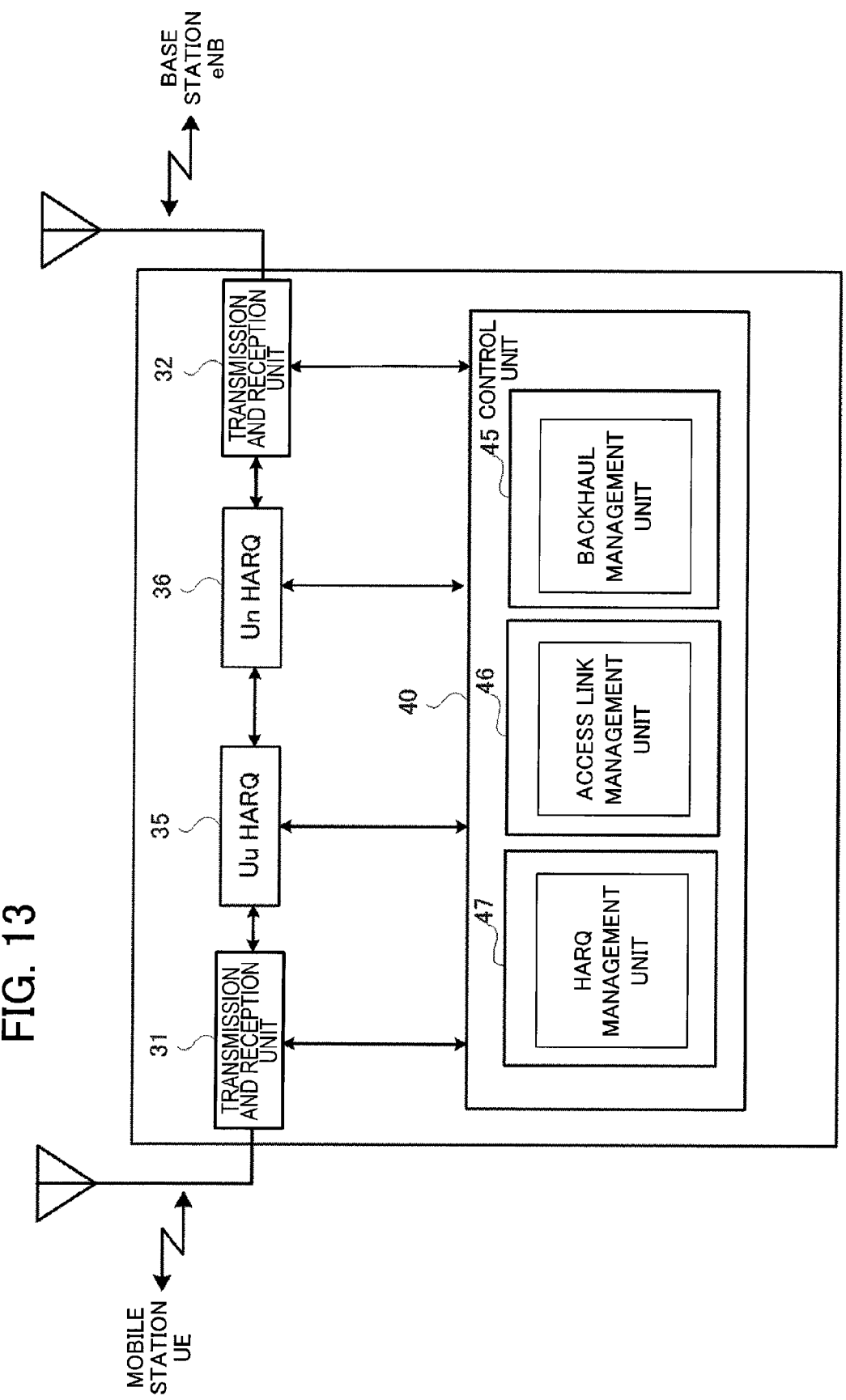
FIG. 13 is a block diagram illustrating a schematic configuration of a relay station RN according to a fifth embodiment.

FIG. 13 is a block diagram illustrating a schematic configuration of the relay station RN.

As illustrated in FIG. 13, the relay station RN according to the present embodiment relays radio communication between the base station eNB and the mobile station UE. This relay station RN includes transmission and reception units 31 and 32, a Uu HARQ unit 35, a Un HARQ unit 36, and a control unit 40. The control unit 40 includes a backhaul management unit 45, an access link management unit 46, and a HARQ management unit 47.

The transmission and reception unit 31 (first transmission and reception unit) performs transmission and reception processing between the relay station RN and the mobile station UE. The transmission and reception unit 32 (second transmission and reception unit) performs transmission and reception processing between the relay station RN and the base station eNB. In this relay station RN, at the time of relay of the radio communication between the base station eNB and the mobile station UE, demodulation and decoding are performed once to received signals. Data signals of the demodulated and decoded received signals are scheduled, and then coded and modulated again for transmission. In the case where a downlink signal is an OFDM signal, for example, the transmission and reception unit 32 FFT-processes an OFDM signal received from the base station eNB to separate a data signal of a subcarrier unit, and subjects the data signal to demodulation and decoding processing. The data signal is subjected to coding and modulation processing again, and mapped to a predetermined radio frame format by a scheduler 33. The transmission and reception unit 31 performs conversion to a time area signal in each subcarrier (IFFT processing), synthesis processing of a time area signal, and CP (Cyclic Prefix) additional processing.

The Uu HARQ unit 35 performs HARQ relating to data transmission and reception between the relay station RN and the mobile station UE. Since the HARQ processing is previously known, detailed description will not be repeated here. At the time of the data transmission to the mobile station UE, for example, the Uu HARQ unit 35 generates data blocks obtained by subjecting information bits to error-correction-coding. In the case where the data blocks are not correctly received by the mobile station UE (in the case where the transmission and reception unit 31 receives the NACK signal), the Uu HARQ unit 35 then performs a process of generating other data blocks based on the same information bits. These data blocks are transmitted from the transmission and reception unit 31. The Uu HARQ unit 35 then generates to the mobile station UE the ACK/NACK signal as an acknowledgment of data from the mobile station UE. This ACK/NACK signal is transmitted from the transmission and reception unit 31.

In the same manner as in the Uu HARQ unit 35, the Un HARQ unit 36 performs the HARQ relating to the data transmission and reception between the relay station RN and the base station eNB.

The transmission and reception unit 32 of the relay station RN receives from the base station eNB a backhaul configuration message having described therein data (refer to FIGS. 9 and 11) of the configuration relating to the configuration of the backhaul. The backhaul management unit 45 of the control unit 40 then configures and manages the backhaul between the relay station RN and the base station eNB based on the data of the configuration included in the backhaul configuration message. The backhaul configuration message is transferred to the mobile station UE connected to the relay station RN.

The access link management unit 46 of the control unit 40 refers to the duration of the backhaul configured by the backhaul management unit 45, and establishes the downlink backhaul to an MBSFN subframe. The access link management unit further manages a UL grant (UL grant to be transmitted by PDCCH) in such a manner that the mobile station UE does not perform the uplink data transmission through the uplink backhaul configured by the backhaul management unit 45 and the UL grant is not given before 4 ms of the uplink backhaul.

The access link management unit 46 as a first measurement duration management unit configures in the mobile station UE allocated to the HARQ process the Measurement gap calculated by the HARQ management unit 47, including the duration in which the HARQ is incapable of being performed in a particular HARQ process. As a message to the mobile station UE, the access link management unit 46 generates a Measurement gap configuration message having described therein information on the duration of the Measurement gap.

The HARQ management unit 47 as a first communication management unit manages the HARQ process in a TTI unit of the subframe. The HARQ management unit 47 allocates the HARQ processes of the process numbers PID1 to PID8 to each connected mobile station UE. Based on the backhaul configuration message received from the base station eNB, the HARQ management unit 47 further calculates the HARQ process unused on the access link between the relay station RN and the mobile station UE, and the duration in which the HARQ is incapable of being performed in the HARQ process.

(5-2) Configuration of Mobile Station UE

Figure 14:
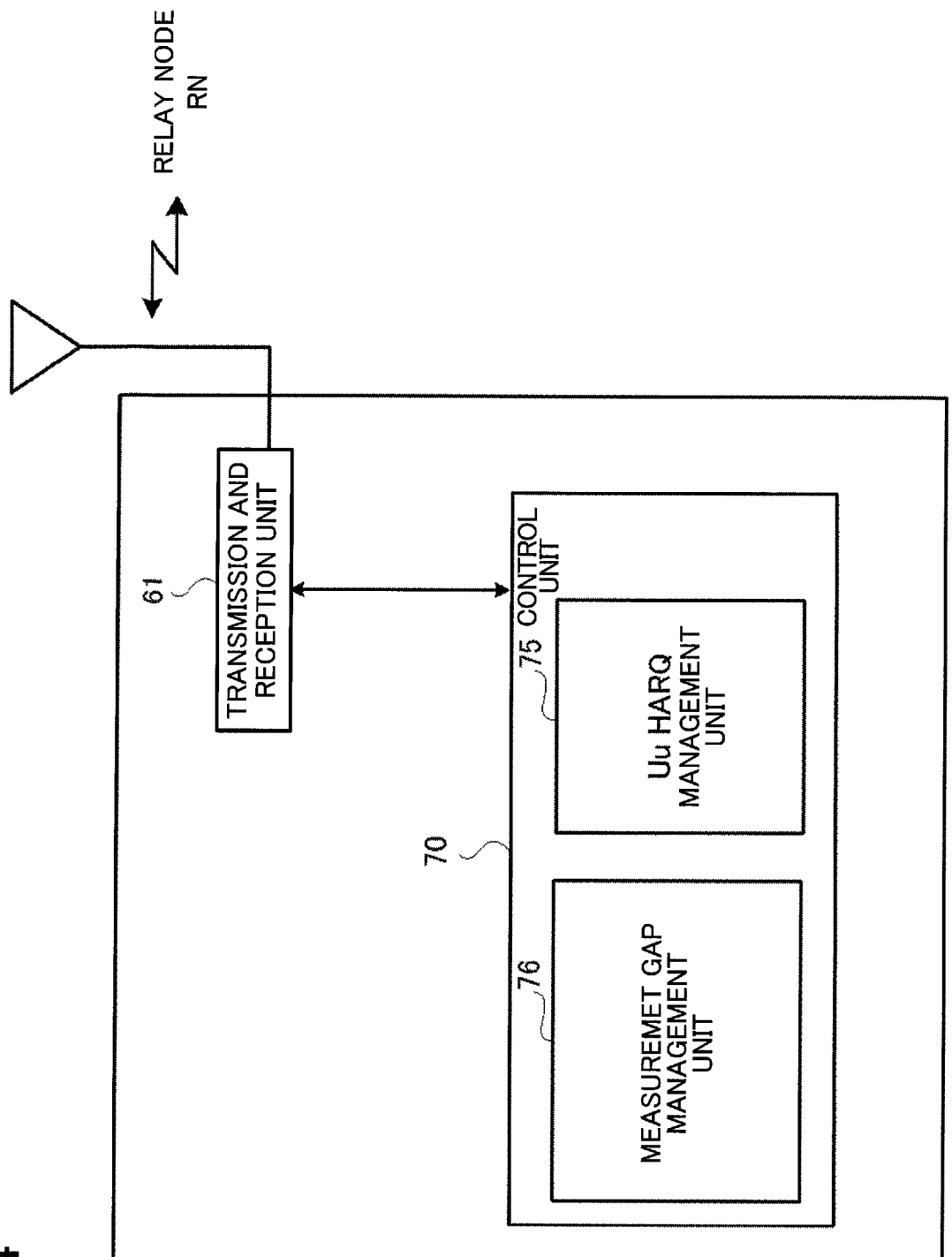
FIG. 14 is a block diagram illustrating a schematic configuration of a mobile station UE according to a fifth embodiment.

FIG. 14 is a block diagram illustrating a schematic configuration of the mobile station UE.

As illustrated in FIG. 14, the mobile station UE according to the present embodiment performs transmission and reception of radio communication between the mobile station UE and the relay station RN. This mobile station UE includes a transmission and reception unit 61 and a control unit 70. The control unit 70 includes a Uu HARQ management unit 75 (second communication management unit) and a Measurement gap management unit 76 (second measurement duration management unit).

The transmission and reception unit 61 performs transmission and reception processing between its own station and any of the relay station RN and the base station eNB. The transmission and reception processing of the transmission and reception unit 61 is the same as that of the relay station RN. Based on the data of the configuration received through the transmission and reception unit 61 from the relay station RN, among the HARQ processes allocated to its own station, the Uu HARQ management unit 75 calculates the duration in which the HARQ is incapable of being performed and manages communication timing through the access link between its own station and the relay station RN. The Measurement gap management unit 76 configures (allocates) the duration of the Measurement gap based on the duration described in the Measurement gap configuring message received from the relay station RN. The Measurement gap management unit 76 further switches a reception frequency in this duration, and performs measurement processing of signals in a frequency band different from that of the relay station RN with which its own station communicates at present.

(5-3) Operation of Relay Station RN

Figure 15:
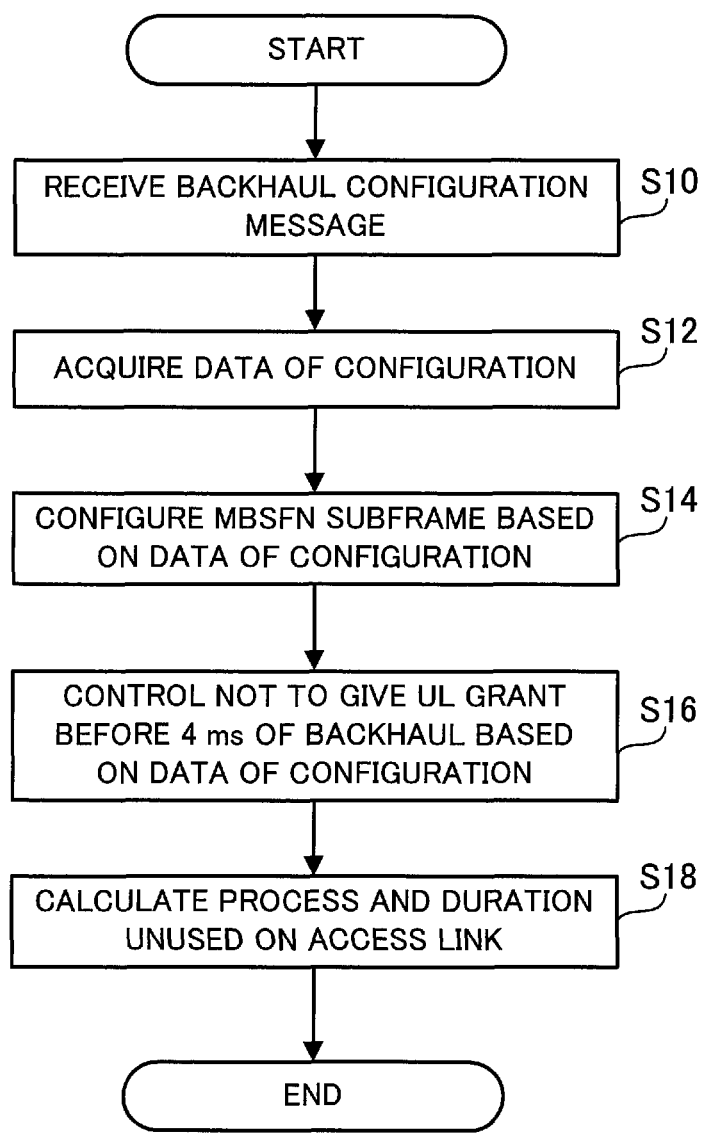
FIG. 15 is a flowchart illustrating one example of operations of a relay station RN according to a fifth embodiment.
Figure 16:
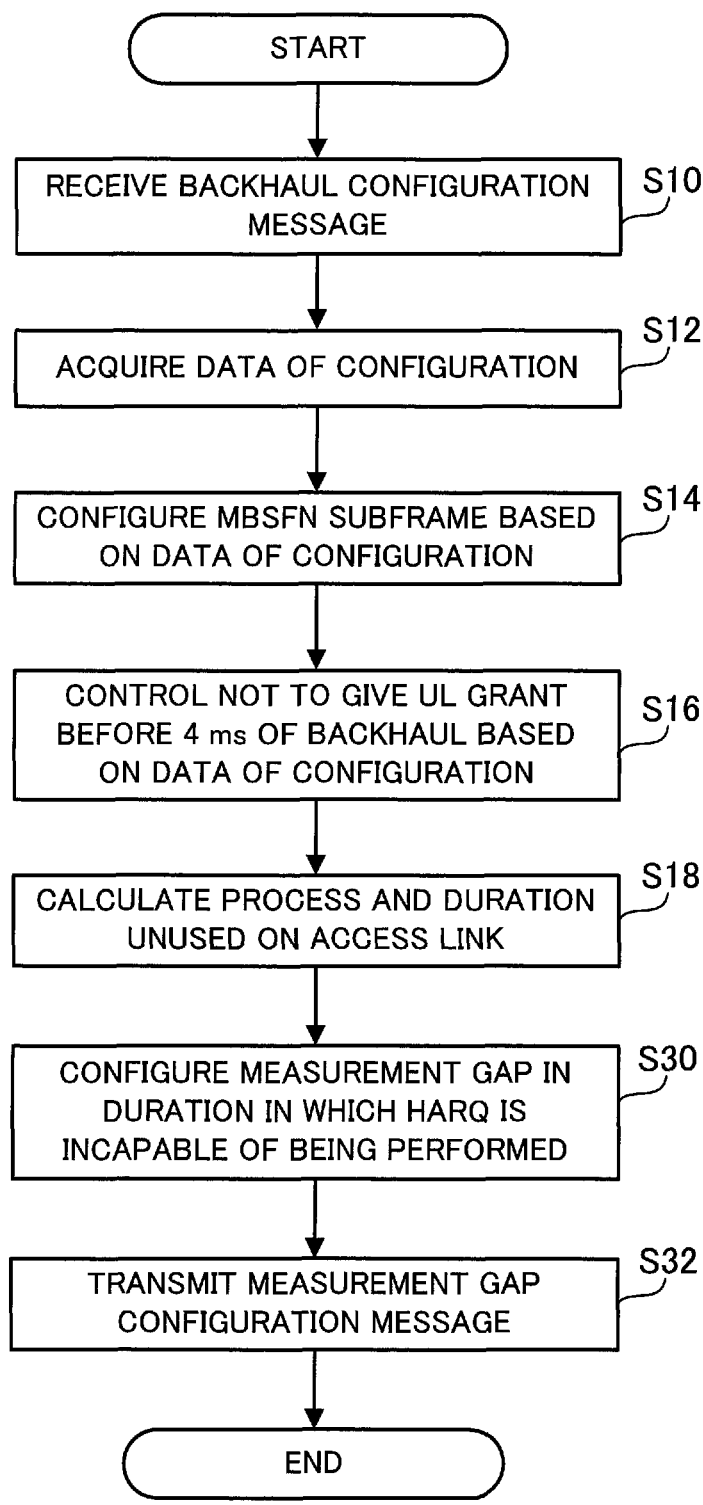
FIG. 16 is a flowchart illustrating one example of operations of a relay station RN according to a fifth embodiment.

Referring next to FIGS. 15 and 16, one example of operations of the relay station RN relating to the backhaul configuration will be mainly described. FIGS. 15 and 16 are flowcharts illustrating one example of operations of the relay station RN. The flowchart of FIG. 15 illustrates operations of the relay station RN corresponding to the second and third embodiments, and the flowchart of FIG. 16 illustrates operations of the relay station RN corresponding to the fourth embodiment.

Referring first to FIG. 15, the transmission and reception unit 32 of the relay station RN receives the backhaul configuration message from the base station eNB (Step S10). The backhaul management unit 45 acquires the data of the Configuration (refer to FIGS. 9 and 11) described in the backhaul configuration message (Step S12). Based on the data of the acquired Configuration, the backhaul management unit 45 configures the downlink backhaul and the uplink backhaul in each Frame according to a value of the SFN mod 4. Next, the access link management unit 46 configures the DL subframe according to the data (e.g., FIG. 9A) of the Configuration acquired at step S12, namely, the MBSFN subframe (Step S14). The access link management unit 46 further configures the uplink backhaul according to the data (e.g., FIG. 9B) of the Configuration acquired at step S12, and controls a stoppage of the UL grant (UL grant transmitted by the PDCCH) to the mobile station UE before 4 ms of the uplink backhaul (Step S16). Based on the data of the configuration acquired at step S12, the HARQ management unit 47 calculates the HARQ process which is unused on the access link between its own station and the mobile station UE (Step S18).

Referring next to FIG. 16, processes of steps S30 and S32 are added to the flowchart of FIG. 15. At step S30, the access link management unit 46 configures the Measurement gap including the duration in which the HARQ is incapable of being performed in the particular HARQ process to the mobile station UE allocated to the HARQ process (Step S30). The transmission and reception unit 31 then transmits to the corresponding mobile station UE the Measurement gap configuration message including information on the duration of the Measurement gap configured at step S30 (Step S32).

(5-4) Operation of Mobile Station UE

Figure 17:
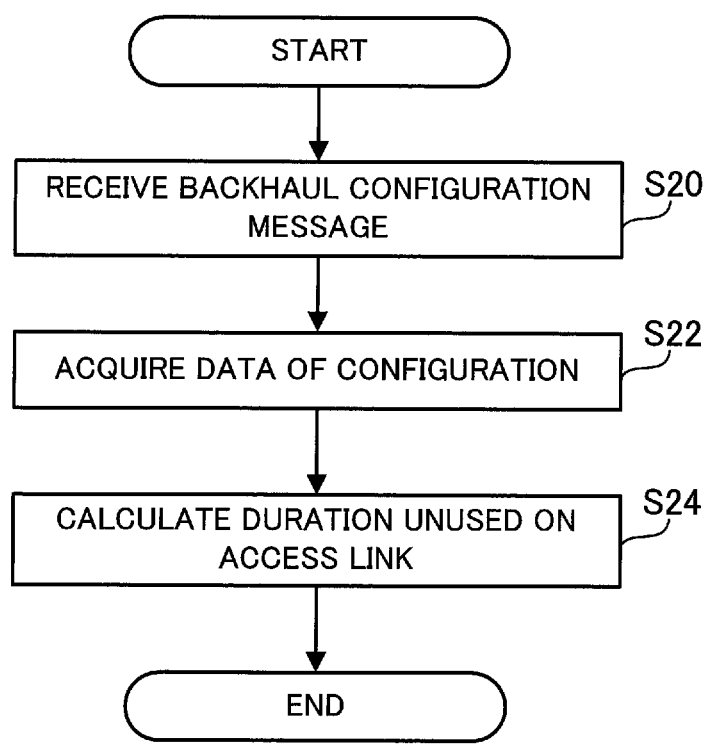
FIG. 17 is a flowchart illustrating one example of operations of a mobile station UE according to a fifth embodiment.
Figure 18:
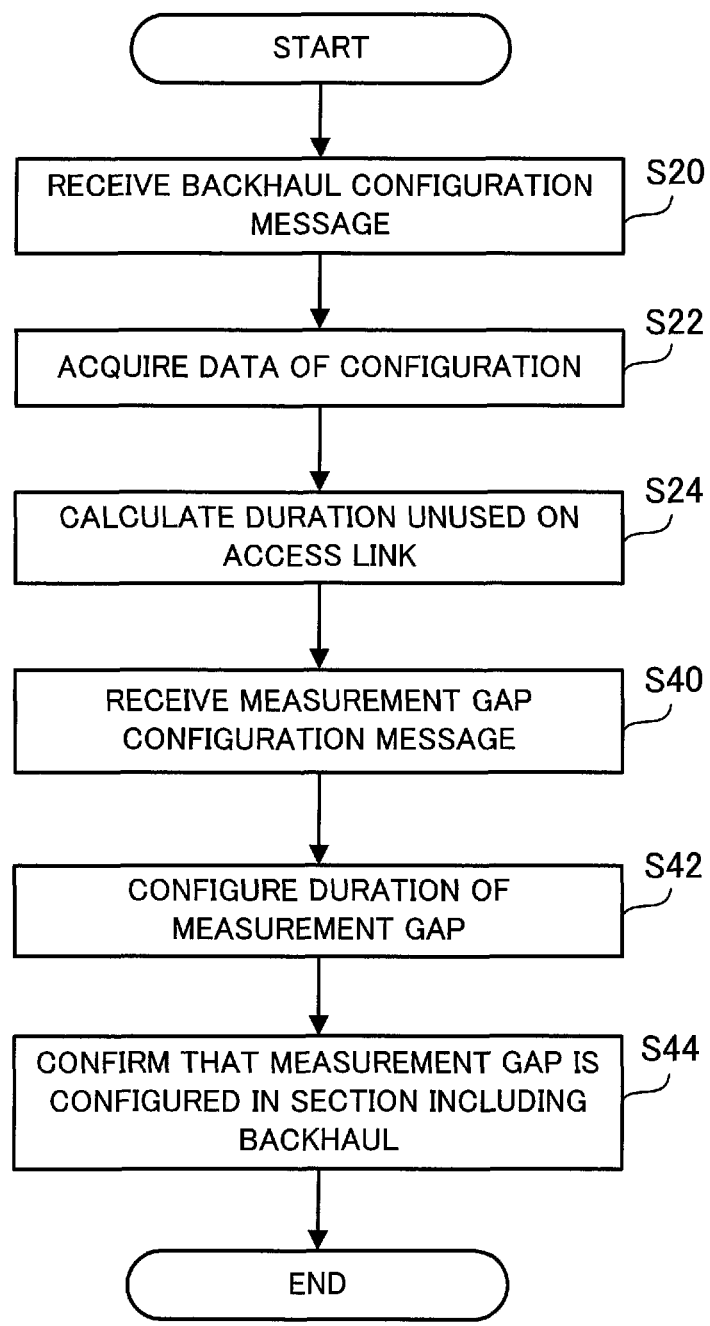
FIG. 18 is a flowchart illustrating one example of operations of a mobile station UE according to a fifth embodiment.

Referring next to FIGS. 17 and 18, one example of operations of the mobile station UE will be described. FIGS. 17 and 18 are flowcharts illustrating one example of operations of the mobile station UE. The flowchart of FIG. 17 illustrates operations of the mobile station UE corresponding to the second and third embodiments, and the flowchart of FIG. 18 illustrates operations of the mobile station UE corresponding to the fourth embodiment.

Referring first to FIG. 17, the transmission and reception unit 61 of the mobile station UE receives the backhaul configuration message transmitted from the relay station RN (Step S20). The Uu HARQ management unit 75 of the control unit 70 acquires the data of the Configuration described in the backhaul configuration message acquired at step S20 (Step S22). Based on the data of the configuration acquired at step S22, the Uu HARQ management unit 75 further calculates the duration in which the HARQ is incapable of being performed among the HARQ processes allocated to its own station (Step S24).

Referring next to FIG. 18, steps S40 to S44 are added to the flowchart of FIG. 17. The transmission and reception unit of the mobile station UE receives the Measurement gap configuration message (Step S40). The Measurement gap management unit 76 configures the duration of the Measurement gap described in the Measurement gap configuration message received at step S40 (Step S42). In the duration of this Measurement gap, the mobile station UE measures a signal in the frequency band different from that of the relay station RN with which its own station communicates at present. Based on the data of the Configuration described in the backhaul configuration message acquired at step S20, the Measurement gap management unit 76 further confirms whether the downlink and uplink backhauls are included in the duration of the Measurement gap configured at step S42 (Step S44).

The proposed communication duration configuring method, relay station RN, mobile station UE, and mobile communication system permit a mobile communication system including the relay station RN which relays radio communication between the base station eNB and the mobile station UE to suppress a reduction in efficiency of an access link at the time of configuring a communication duration between the base station eNB and the relay station RN.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication duration configuring method for use in a mobile communication system including a relay station which relays radio communication between a base station and a mobile station, the communication duration configuring method comprising:
configuring, by the relay station according to an instruction from the base station, at least one of a downlink communication duration in which the relay station receives a transmission signal from the base station during a subframe of a radio frame among a plurality of continuous radio frames configured as a MBSFN subframe for communication from the relay station to the mobile station and an uplink communication duration in another subframe of the radio frame or a next radio frame in which the relay station transmits a transmission signal to the base station while limiting transmission of any signal from the mobile station to the relay station;
wherein a plurality of HARQ processes, each having an identifier different from each other, are provided on an access link between the mobile station and the relay station;
communication processing including data transmission and feedback in response to the data transmission after the data transmission is managed in a HARQ process among the plurality of HARQ processes;
for the plurality of continuous radio frames, the uplink communication duration is configured during the subframe of uplink data transmission of a HARQ process having a particular identifier among the plurality of HARQ processes; and
the downlink communication duration, after a predetermined time period of the uplink communication duration, is configured,
wherein the configuring of the at least one of the downlink communication duration and the uplink communication duration makes it possible to perform the communication processing in HARQ processes, among the plurality of HARQ processes, and makes the HARQ process having the particular identifier incapable of being performed throughout the plurality of continuous radio frames.

2. The communication duration configuring method according to claim 1, wherein
a duration in which the communication processing is incapable of being performed among the plurality of HARQ processes is allocated to a measurement period for measuring, by the mobile station, a radio signal of a frequency different from a communication frequency between the relay station and the mobile station.

3. The communication duration configuring method according to claim 1, wherein at least a part of the uplink communication duration is allocated to an uplink data transmission that needs no feedback from the base station.

4. A relay station in a mobile communication system including the relay station, a base station and a mobile station, to relay radio communication between the base station and the mobile station, the relay station comprising:
a first transceiver to transmit and receive a signal between the relay station and the base station;
a second transceiver to transmit and receive a signal between the relay station and the mobile station; and
a controller to configure, according to an instruction from the base station, at least one of a downlink communication duration in which the first transceiver receives a transmission signal from the base station while the second transceiver configures a subframe of a radio frame among a plurality of continuous radio frames configured as a MBSFN subframe for communication from the relay station to the mobile station and an uplink communication duration in another subframe of the radio frame or a next radio frame in which the first transceiver transmits a transmission signal to the base station while the mobile station limits transmission of any signal from the mobile station to the relay station, and manage a plurality of HARQ processes, each having an identifier, in which communication processing including data transmission and feedback in response to the data transmission after the data transmission is performed on an access link between the mobile station and the relay station,
wherein, for the plurality of continuous radio frames, the controller configures the communication duration so as to limit, among the plurality of HARQ processes, a HARQ process in which the communication processing is incapable of being performed to a HARQ process having a particular identifier, and the limit makes it possible to perform the communication processing in HARQ processes, among the plurality of HARQ processes, and makes the HARQ process having the particular identifier incapable of being performed throughout the plurality of continuous radio frames.

5. The relay station according to claim 4, wherein the controller is further configured to allocate a measurement period for measuring a radio signal of a frequency, different from a communication frequency between the relay station and the mobile station, to a duration in which the communication processing is incapable of being performed.

6. The relay station according to claim 4, wherein at least a part of the uplink communication duration is allocated to uplink data transmission that needs no feedback from the base station.

7. A mobile station in a mobile communication system including a relay station, a base station and the mobile station, to perform radio communication with the base station through the relay station, the mobile station comprising:
a transceiver to transmit and receive a radio signal to and from the relay station; and
a controller to manage communication timing between the mobile station and the relay station based on at least one of
a downlink communication duration in which the relay station receives a transmission signal from the base station during a subframe of a radio frame among a plurality of continuous radio frames configured as a MBSFN subframe for communication from the relay station to the mobile station and
an uplink communication duration in another subframe of the radio frame or a next radio frame in which the relay station transmits a transmission signal to the base station while limiting transmission of any signal from the mobile station to the relay station,
wherein, for the plurality of continuous radio frames, the communication duration is configured so that a HARQ process in which communication processing including data transmission and feedback in response to the data transmission after the data transmission is incapable of being performed, is limited to a HARQ process having a particular identifier, and said limit makes it possible to perform the communication processing in HARQ processes, among the plurality of HARQ processes, and makes the HARQ process having the particular identifier incapable of being performed throughout the plurality of continuous radio frames.

8. The mobile station according to claim 7, wherein the controller allocates a measurement period for measuring a radio signal of a frequency different from a communication frequency between the mobile station and the relay station communicating therewith to a duration in which the communication processing is incapable of being performed.

9. A mobile communication system comprising:
a base station; a mobile station; and a relay station to relay radio communication between the base station and the mobile station, wherein:
the relay station comprises a controller which configures, according to an instruction from the base station, at least one of
a downlink communication duration in which the relay station receives a transmission signal from the base station during a subframe of a radio frame among a plurality of continuous radio frames configured as a MBSFN subframe for communication from the relay station to the mobile station and
an uplink communication duration in another subframe of the radio frame or a next radio frame in which the relay station transmits a transmission signal to the base station while limiting transmission of any signal from the mobile station to the relay station;
the base station comprises a transceiver which transmits and receives a signal between the base station and the relay station based on the communication duration;
the mobile station comprises a transceiver which transmits and receives a signal between the mobile station and the relay station based on the communication duration; and
wherein a plurality of HARQ processes, each having an identifier, are provided on an access link between the mobile station and the relay station,
communication processing including data transmission and feedback in response to the data transmission after the data transmission is managed in a HARQ process among the plurality of HARQ processes, for the plurality of continuous radio frames, the communication duration is configured so that, among the plurality of HARQ processes, a HARQ process in which the communication processing is incapable of being performed, is limited to a HARQ process having a particular identifier, and said limit makes it possible to perform the communication processing in HARQ processes, among the plurality of HARQ processes, and makes the HARQ process having the particular identifier incapable of being performed throughout the plurality of continuous radio frames.

10. The mobile communication system according to claim 9, wherein
a duration in which the communication processing is incapable of being performed among the plurality of HARQ processes, is allocated to a measurement period for measuring, by the mobile station, a radio signal of a frequency different from a communication frequency between the relay station and the mobile station.

11. The mobile communication system according to claim 9, wherein at least a part of the uplink communication duration is allocated to uplink data transmission that needs no feedback from the base station.

12. A mobile communication system comprising:
a base station;
a mobile station; and
a relay station to relay radio communication between the base station and the mobile station, wherein:
the base station comprises
a controller to configure, according to an instruction from the base station, at least one of
a downlink communication duration in which the relay station receives a transmission signal from the base station during a subframe of a radio frame among a plurality of continuous radio frames as a MBSFN subframe for communication from the relay station to the mobile station and
an uplink communication duration in another subframe of the radio frame or a next radio frame in which the relay station transmits a transmission signal to the base station while limiting transmission of any signal from the mobile station to the relay station;
the relay station comprises a controller to provide a plurality of HARQ processes, each having an identifier, in which communication processing including data transmission and feedback in response to the data transmission after the data transmission is managed on an access link between the mobile station and the relay station; and
the mobile station communicates with the relay station, wherein, for the plurality of continuous radio frames, the uplink communication duration configured during the subframe of uplink data transmission of a HARQ process having a particular identifier among the plurality of HARQ processes,
the downlink communication duration after a predetermined time period of the uplink communication duration is configured, and
said configuring of the at least one of the downlink communication duration and the uplink communication duration makes it possible to perform the communication processing in HARQ processes, among the plurality of HARQ processes, and makes the HARQ process having the particular identifier incapable of being performed throughout the plurality of continuous radio frames.

* * * * *